United States Patent
Oizumi et al.

(10) Patent No.: US 9,923,693 B2
(45) Date of Patent: *Mar. 20, 2018

(54) BASE STATION AND COMMUNICATION METHOD

(71) Applicant: Sun Patent Trust, New York, NY (US)

(72) Inventors: Toru Oizumi, Kanagawa (JP); Akihiko Nishio, Osaka (JP); Ayako Horiuchi, Kanagawa (JP)

(73) Assignee: Sun Patent Trust, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/487,068

(22) Filed: Apr. 13, 2017

(65) Prior Publication Data
US 2017/0222778 A1    Aug. 3, 2017

Related U.S. Application Data

(63) Continuation of application No. 15/207,310, filed on Jul. 11, 2016, now Pat. No. 9,654,268, which is a
(Continued)

(30) Foreign Application Priority Data

May 11, 2012   (JP) ................................. 2012-109502

(51) Int. Cl.
H04W 4/00 (2009.01)
H04L 5/00 (2006.01)
H04W 72/04 (2009.01)

(52) U.S. Cl.
CPC ......... *H04L 5/0053* (2013.01); *H04W 72/042* (2013.01)

(58) Field of Classification Search
None
See application file for complete search history.

(56) References Cited

U.S. PATENT DOCUMENTS

9,419,764 B2    8/2016  Oizumi et al.
2009/0016278 A1  1/2009  Wakabayashi
(Continued)

FOREIGN PATENT DOCUMENTS

CN    102355325 A    2/2012
JP    2012-050133 A  3/2012
(Continued)

OTHER PUBLICATIONS

Chinese Search Report, dated Jun. 1, 2017, for corresponding Chinese Application No. 201380001971.1, 2 pages.
English Translation of Taiwanese Search Report, dated Aug. 15, 2016, for corresponding TW Application No. 102110469, 2 pages.
Ericsson, ST-Ericsson, "A/N transmission in the uplink for carrier aggregation," R1-100909, Agenda Item: 7.1.6, 3GPP TSG-RAN WG1 #60, San Francisco, USA, Feb. 22-26, 2010, 4 pages.
(Continued)

*Primary Examiner* — Otis L Thompson, Jr.
(74) *Attorney, Agent, or Firm* — Seed IP Law Group LLP

(57) ABSTRACT

A terminal device capable of providing a method for determining PUCCH resources used for notification of response signals indicating error detection results for downlink line data, when ARQ is applied during communications using an uplink unit band and a plurality of downlink unit bands associated to the uplink unit band and when downlink data allocations are instructed using an ePDCCH. In this device, a control unit (208) determines A/N resources on the basis of whether a channel used for transmitting downlink control information (DCI) is a PDCCH or an ePDCCH.

15 Claims, 16 Drawing Sheets

Related U.S. Application Data continuation of application No. 14/237,551, filed as application No. PCT/JP2013/001774 on Mar. 15, 2013, now Pat. No. 9,419,764.

(56) References Cited

U.S. PATENT DOCUMENTS

| | | |
|---|---|---|
| 2012/0106478 A1 | 5/2012 | Han et al. |
| 2012/0207107 A1 | 8/2012 | Li et al. |
| 2012/0320846 A1 | 12/2012 | Papasakellariou et al. |
| 2013/0022011 A1 | 1/2013 | Enomoto et al. |
| 2013/0114556 A1 | 5/2013 | Yang et al. |
| 2013/0142160 A1 | 6/2013 | Hoshino et al. |
| 2013/0182675 A1 | 7/2013 | Ahn et al. |
| 2013/0188590 A1 | 7/2013 | Aiba et al. |
| 2013/0229997 A1 | 9/2013 | Lunttila et al. |
| 2013/0230017 A1* | 9/2013 | Papasakellariou  H04W 72/0406 370/330 |
| 2013/0230029 A1 | 9/2013 | Papasakellariou et al. |
| 2013/0230030 A1 | 9/2013 | Papasakellariou et al. |
| 2013/0258864 A1 | 10/2013 | Chen et al. |
| 2013/0272258 A1 | 10/2013 | Lee et al. |
| 2014/0161088 A1 | 6/2014 | Seo et al. |
| 2014/0254410 A1 | 9/2014 | Seo et al. |
| 2015/0071196 A1 | 3/2015 | Park et al. |
| 2015/0237611 A1 | 8/2015 | Ahn et al. |

FOREIGN PATENT DOCUMENTS

| | | |
|---|---|---|
| TW | 201215203 A | 4/2012 |
| WO | 2013/020518 A1 | 2/2013 |

OTHER PUBLICATIONS

Ericsson, ST-Ericsson, "On PDCCH enhancements for CA," R1-121009, Agenda Item: 7.2.1.1, 3GPP TSG-RAN WG1 #68bis, Jeju, Republic of Korea, Mar. 26-30, 2012, 5 pages.

ETSI TS 136 211 V10.4.0, "LTE; Evolved Universal Terrestrial Radio Access (E-UTRA); Physical channels and modulation (3GPP TS 36.211 version 10.4.0 Release 10)," Jan. 2012, 103 pages.

ETSI TS 136 212 V10.5.0, "LTE; Evolved Universal Terrestrial Radio (E-UTRA); Multiplexing and channel coding (3GPP TS 36.212 version 10.5.0 Release 10)," Mar. 2012, 81 pages.

ETSI TS 136 213 V10.5.0, "LTE: Evolved Universal Terrestrial Radio Access (E-UTRA); Physical layer procedures (3GPP TS 36.213 version 10.5.0 Release 10)," Mar. 2012, 127 pages.

International Search Report, dated Apr. 16, 2013, for corresponding International application No. PCT/JP2013/001774, 2 pages. (W/ English Translation).

Nakao et al., "Performance enhancement of E-UTRA uplink control channel in fast fading environments," Vehicular Technology Conference, Barcelona, Apr. 26-29, 2009, 5 pages.

Panasonic, "UL ACK/NACK transmission on PUCCH for carrier aggregation," R1-091744, Agenda Item: 15.4, 3GPP TSG-RAN WG1 Meeting #57, San Francisco, USA, May 4-8, 2009, 3 pages.

Samsung, "HARQ-ACK Transmission in Response to E-PDCCH Detection," R1-120193, Agenda Item: 7.6.5, 3GPP TSG RAN WG1 #68, Dresden, Germany, Feb. 6-10, 2012, 3 pages.

ZTE, "Uplink Control Channel Design for LTE-Advanced," R1-091702, Agenda Item: 15.4, TSG-RAN WG1 #57, San Francisco, USA, May 4-8, 2009, 6 pages.

\* cited by examiner

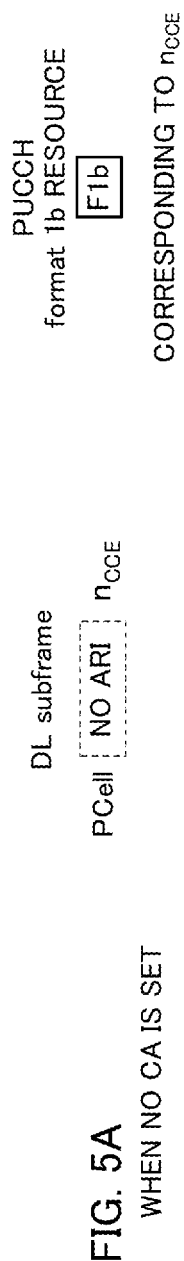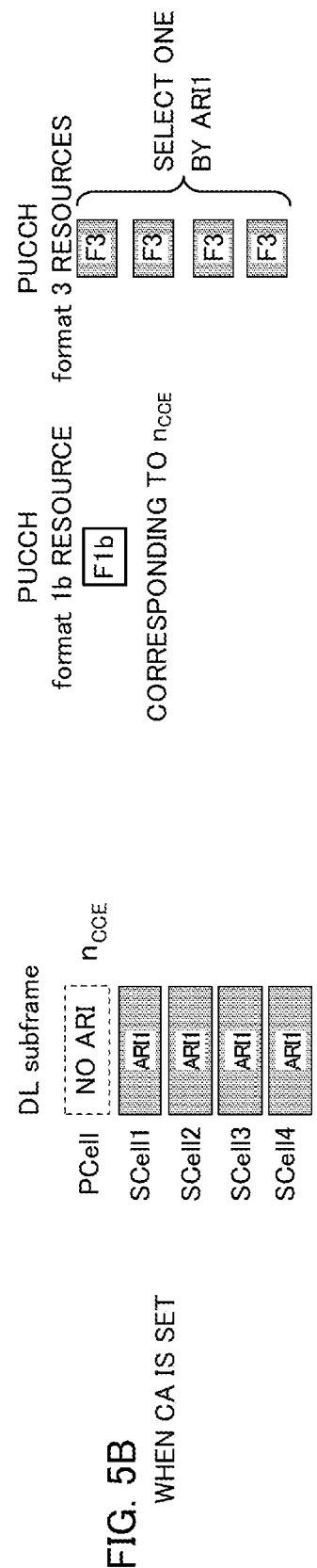
FIG. 5A WHEN NO CA IS SET
FIG. 5B WHEN CA IS SET

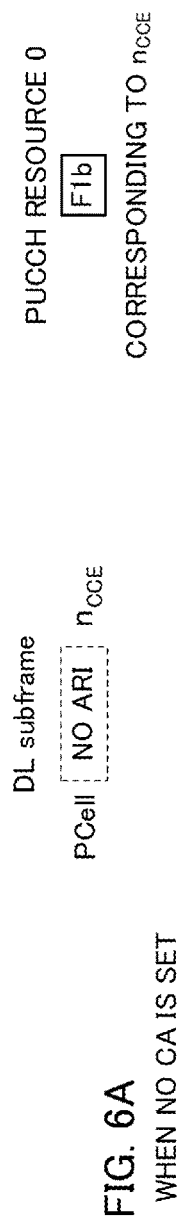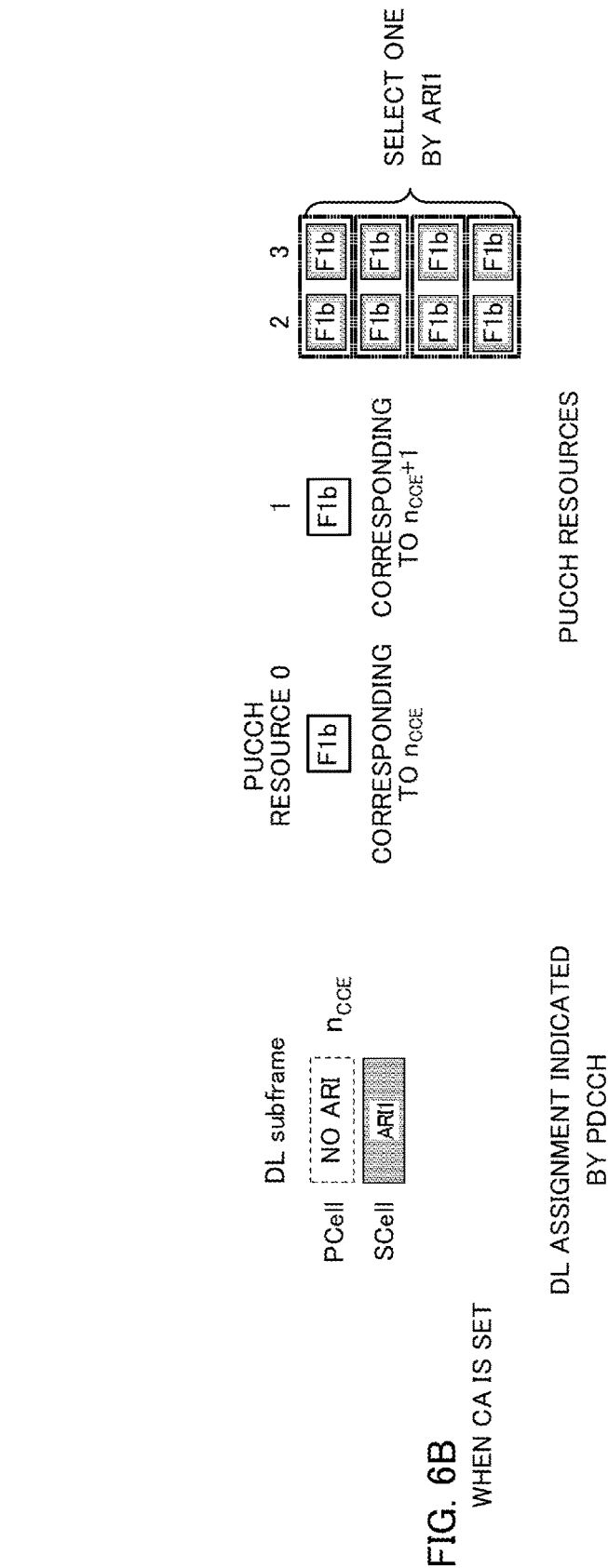

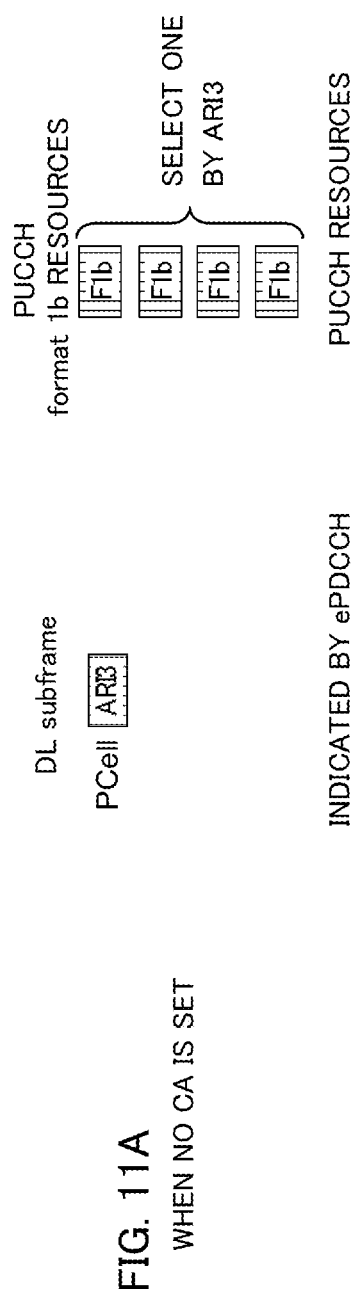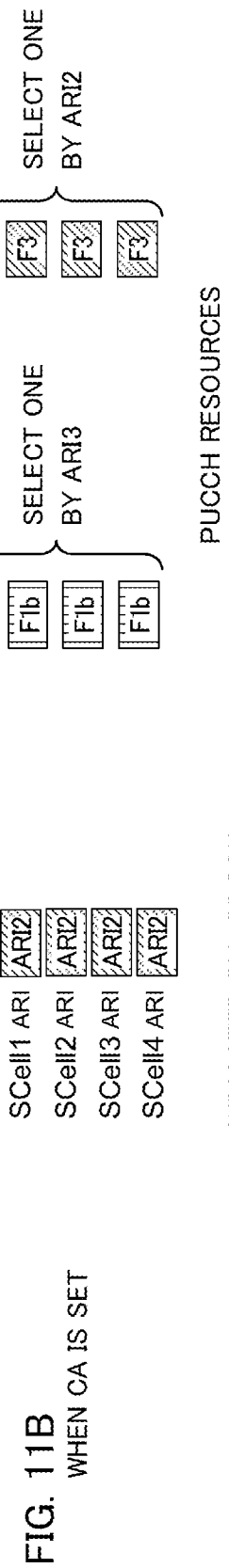

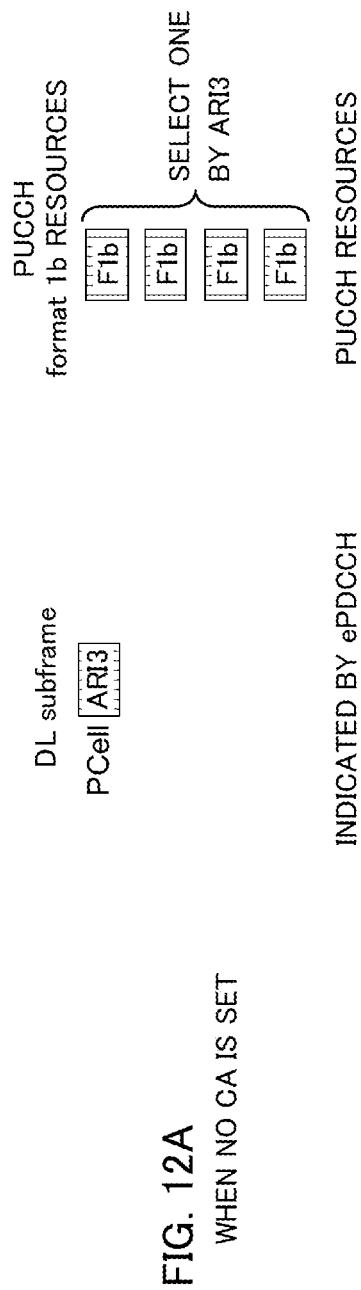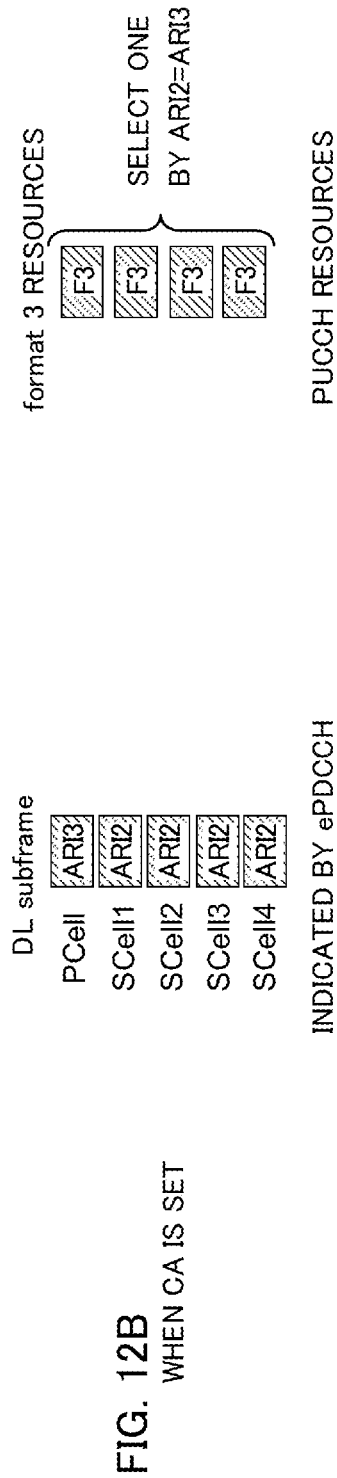
FIG. 12A WHEN NO CA IS SET
FIG. 12B WHEN CA IS SET

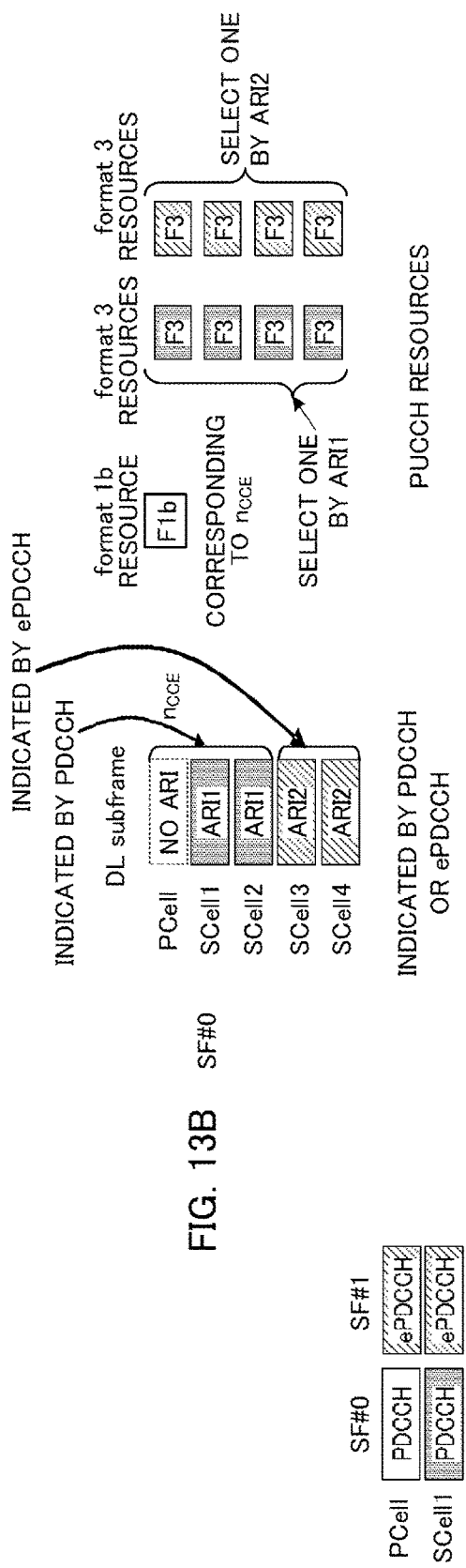
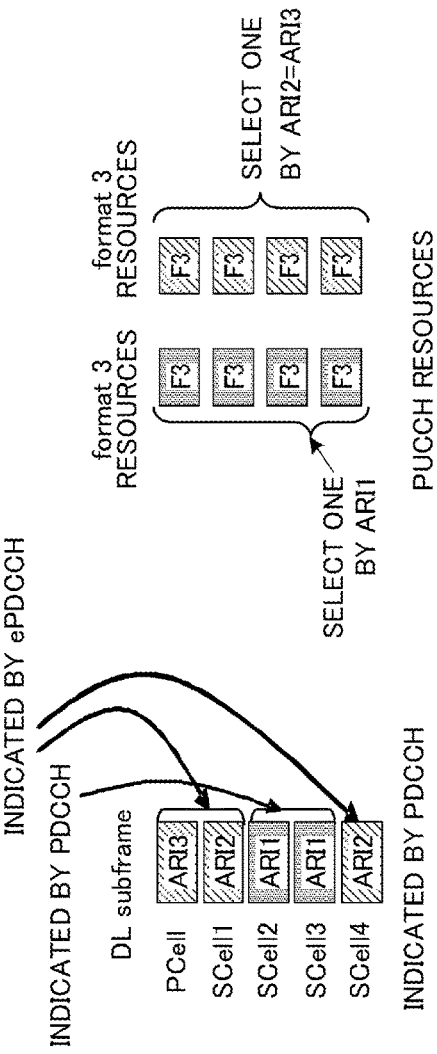
FIG. 13A
FIG. 13B
FIG. 13C

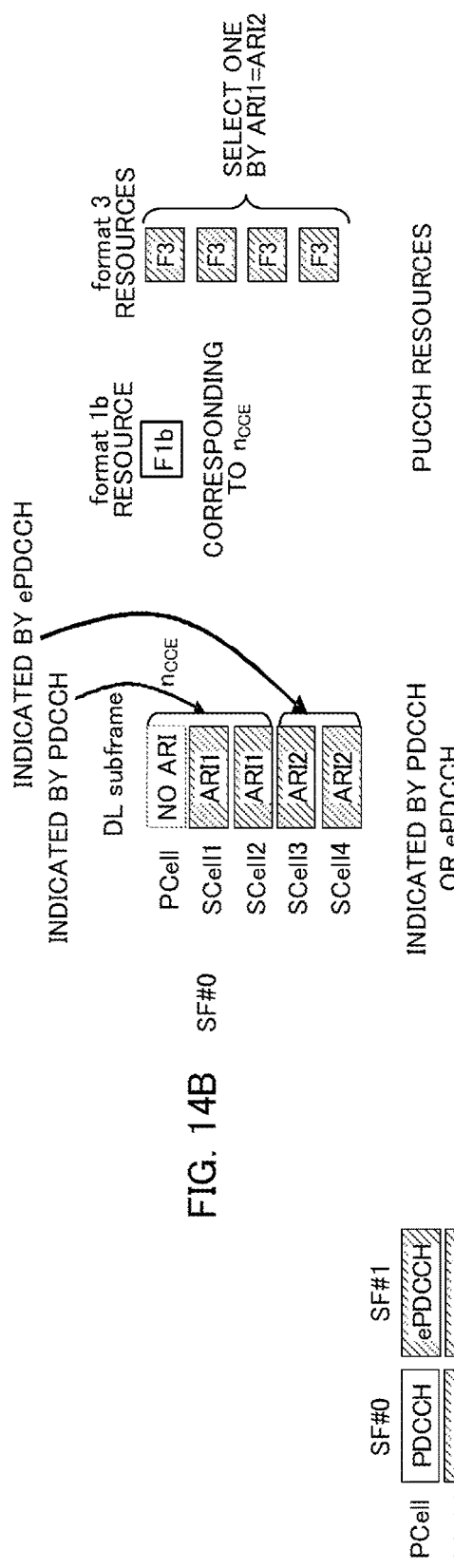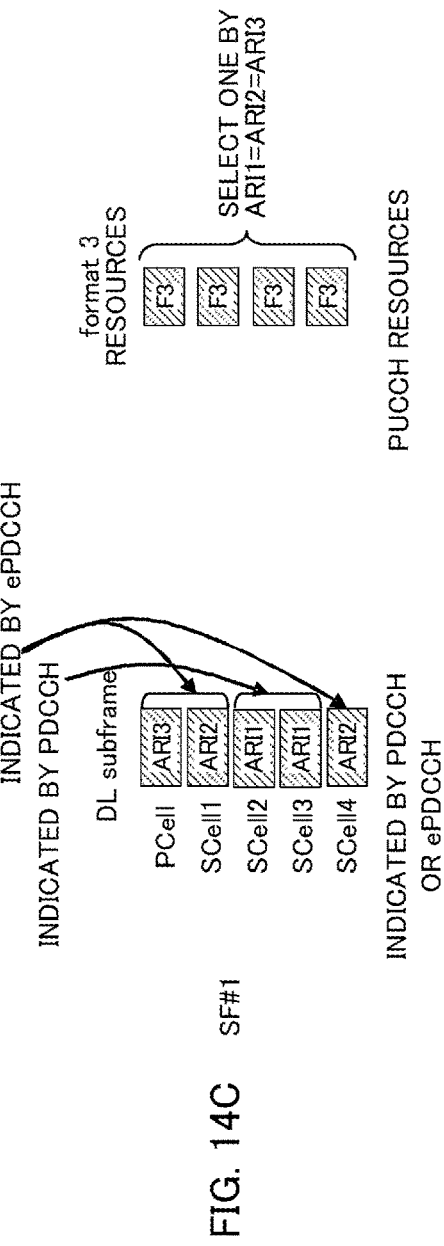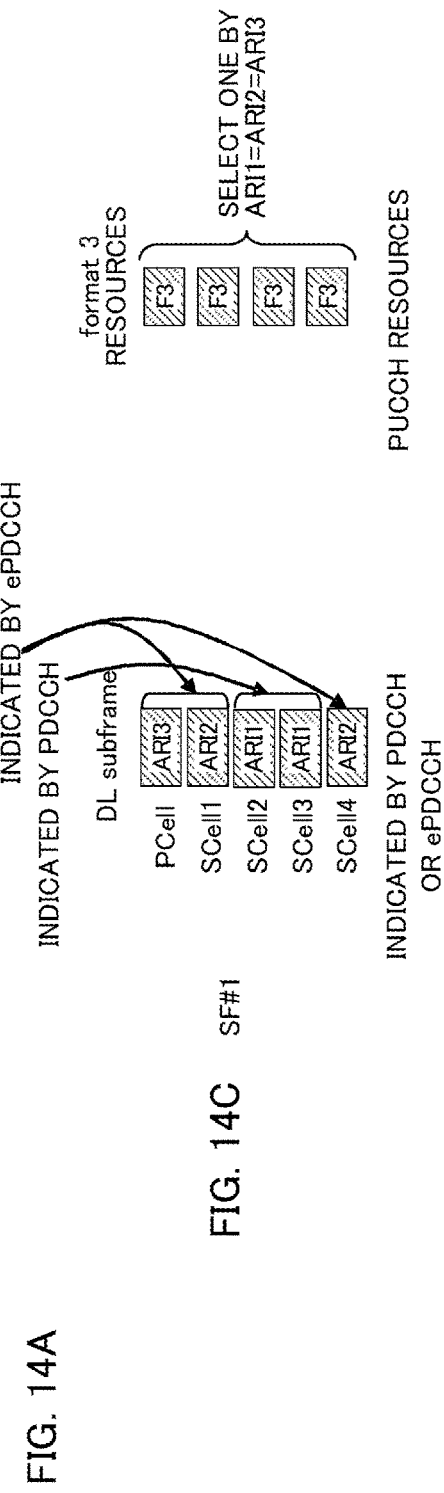

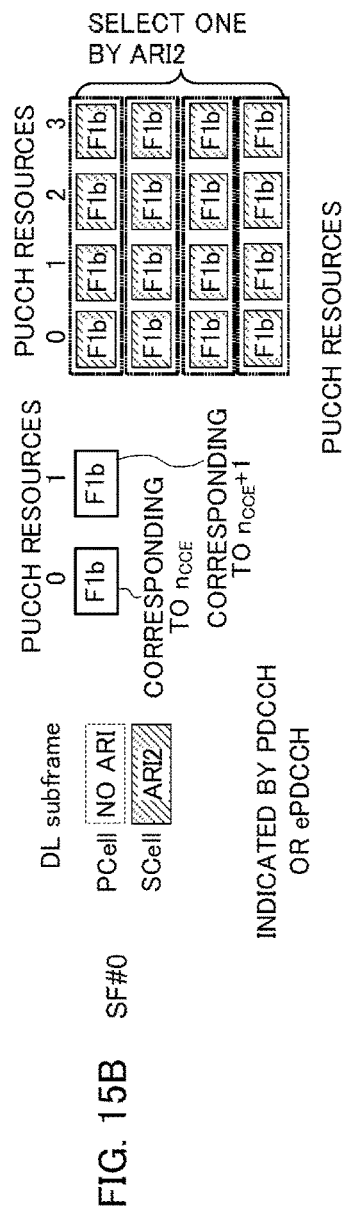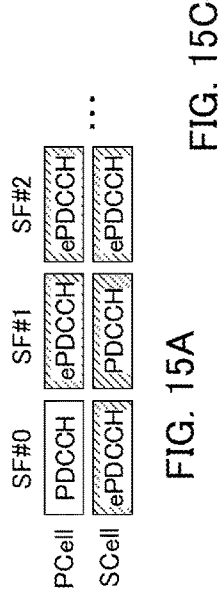

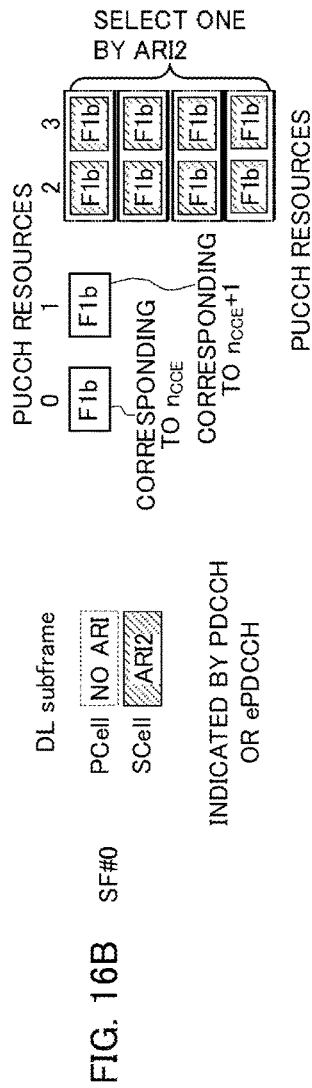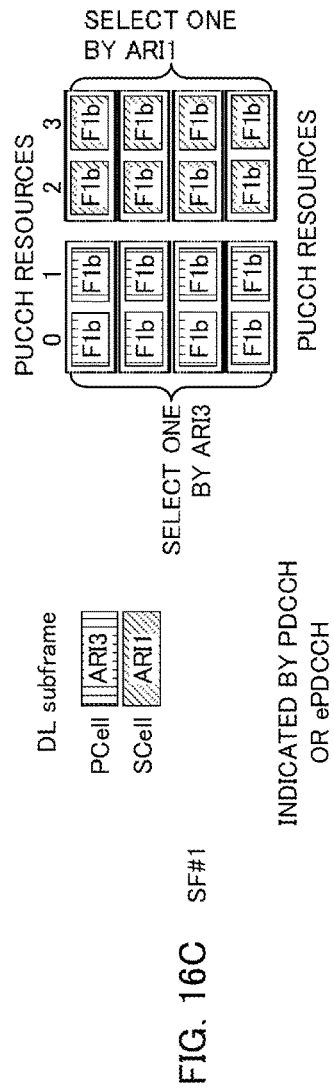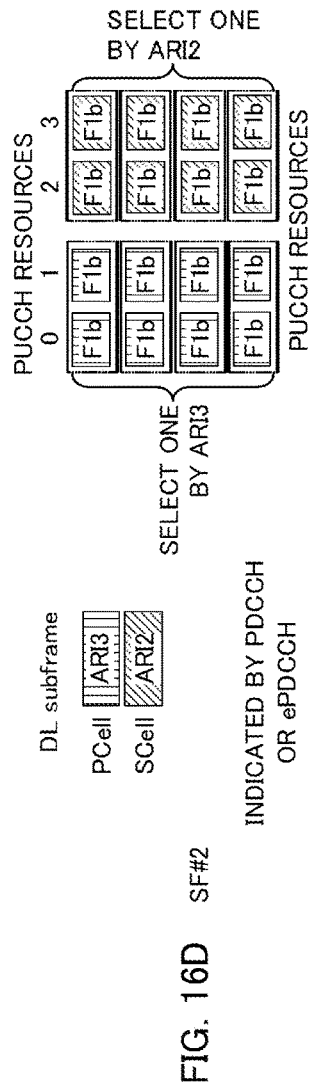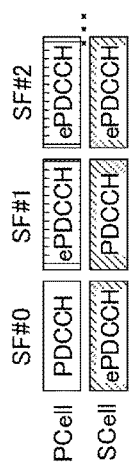

BASE STATION AND COMMUNICATION METHOD

TECHNICAL FIELD

The present invention relates to a terminal apparatus, a base station apparatus and a transmission and reception method.

BACKGROUND ART

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with a base station. Subsequently, the terminal reads BCH information to acquire base station-specific parameters such as a frequency bandwidth (see, Non-Patent Literature (hereinafter, abbreviated as NPL) 1, 2 and 3).

In addition, upon completion of the acquisition of the base station-specific parameters, each terminal performs a connection request to the base station to thereby establish a communication link with the base station. The base station transmits control information via a downlink control channel such as Physical Downlink Control CHannel (PDCCH) as appropriate to the terminal with which a communication link has been established.

The terminal performs "blind-determination" on each of a plurality of control information items included in the received PDCCH (i.e., Downlink (DL) Assignment Control Information: also referred to as Downlink Control Information (DCI)). Specifically, each of the control information items includes a Cyclic Redundancy Check (CRC) part and the base station masks this CRC part using the terminal ID of the transmission target terminal. Accordingly, until the terminal demasks the CRC part of the received control information item with its own terminal ID, the terminal cannot determine whether or not the control information item is intended for the terminal. In this blind-determination, if the result of demasking the CRC part indicates that the CRC operation is OK, the control information item is determined as being intended for the terminal.

Moreover, in 3GPP LTE, Automatic Repeat Request (ARQ) is applied to downlink data to terminals from a base station. Specifically, each terminal feeds back response signals indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as response signals. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. The PDCCH includes one or more L1/L2 control channels (L1/L2 CCH). Each L1/L2 CCH consists of one or more Control Channel Elements (CCE). More specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for reporting the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits response signals to the base station using the identified resources. However, when the L1/L2 CCH occupies a plurality of contiguous CCEs, the terminal transmits the response signals to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. More specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: $W_0$-$W_3$ (may be referred to as Walsh Code Sequence)) and a DFT sequence (length-3: $F_0$-$F_2$). To put it more specifically, each component of the signals of length-12 (i.e., response signals after primary-spread or ZAC sequence serving as reference signals (i.e., Reference Signal Sequence)) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). In FIG. 2, "subcarriers" in the vertical axis of the drawing are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. More specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communications than 3GPP LTE is in progress. 3GPP LTE-Advanced systems (may be referred to as "LTE-A system," hereinafter) follow LTE systems. 3GPP LTE-Advanced introduces base stations and terminals capable of communicating with each other using a wideband frequency of 40 MHz or greater to realize a downlink transmission rate up to 1 Gbps or above.

In the LTE-A system, in order to simultaneously achieve backward compatibility with the LTE system and ultra-high-speed communications several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. Moreover, in FDD (frequency division duplex) systems, "component carrier" in downlink (hereinafter, referred to as "downlink component carrier") is defined as a band obtained by dividing a band according to downlink frequency band information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the band and PUCCHs for LTE on both ends of the band. Note that the term "component carrier" may be also referred to as "cell" in English in 3GPP LTE-Advanced. In addition, "component carrier" may be also abbreviated as CC(s).

The LTE-A system supports communication using a band obtained by bundling several component carriers, so-called carrier aggregation (CA). Note that while a UL-DL configuration can be set for each component carrier, an LTE-A system compliant terminal (hereinafter, referred to as "LTE-A terminal") is designed on the assumption that the same UL-DL configuration is set among a plurality of component carriers.

FIGS. 3A and 3B are diagrams provided for describing asymmetric carrier aggregation and a control sequence applied to individual terminals.

As illustrated in FIG. 3B, a configuration in which carrier aggregation is performed using two downlink component carriers and one uplink component carrier on the left is set for terminal 1, while a configuration in which the two downlink component carriers identical with those used by terminal 1 are used but uplink component carrier on the right is used for uplink communications is set for terminal 2.

Referring to terminal 1, a base station (that is, LTE-A system compliant base station (hereinafter, referred to as "LTE-A base station")) and an LTE-A terminal included in the LTE-A system transmit and receive signals to and from each other in accordance with the sequence diagram illustrated in FIG. 3A. As illustrated in FIG. 3A, (1) terminal 1 is synchronized with the downlink component carrier on the left when starting communications with the base station and reads information on the uplink component carrier paired with the downlink component carrier on the left from a broadcast signal called system information block type 2 (SIB2). (2) Using this uplink component carrier, terminal 1 starts communications with the base station by transmitting, for example, a connection request to the base station. (3) Upon determining that a plurality of downlink component carriers need to be assigned to the terminal, the base station instructs the terminal to add a downlink component carrier. However, in this case, the number of uplink component carriers is not increased, and terminal 1, which is an individual terminal, starts asymmetric carrier aggregation.

In addition, in the LTE-A system to which carrier aggregation is applied, a terminal may receive a plurality of downlink data items on a plurality of downlink component carriers at a time. In LTE-A, studies have been carried out on channel selection (also referred to as "multiplexing"), bundling and a discrete Fourier transform spread orthogonal frequency division multiplexing (DFT-S-OFDM) format (may also be referred to as "PUCCH Format 3") as a method of transmitting a plurality of response signals for the plurality of downlink data items. In channel selection, a terminal causes not only symbol points used for response signals, but also the resources to which the response signals are mapped to vary in accordance with the pattern for results of the error detection on the plurality of downlink data items. Compared with channel selection, in bundling, a terminal bundles ACK or NACK signals generated according to the results of error detection on the plurality of downlink data items (i.e., bundles by calculating a logical AND of the results of error detection on the plurality of downlink data items, provided that ACK=1 and NACK=0), and transmits response signals using one predetermine resource (see NPLs 6 and 7). In transmission using the DFT-S-OFDM format (PUCCH Format 3), a terminal jointly encodes (i.e., joint coding) the response signals for the plurality of downlink data items and transmits the coded data using the format (see, NPL 5). For example, a terminal may feed back the response signals (i.e., ACK/NACK) using channel selection, bundling or DFT-S-OFDM according to the number of bits for a pattern for results of error detection. Alternatively, a base station may previously configure the method of transmitting the response signals.

Furthermore, as shown in FIG. 4, the terminal transmits response signals using one of a plurality of component carriers. A component carrier that transmits such response signals is called "primary component carrier (PCC)" or "primary cell (PCell)." A component carrier other than the primary component carrier is called "secondary component carrier (SCC)" or "secondary cell (SCell)." For example, the PCC (PCell) is a component carrier that transmits broadcast information on a component carrier that transmits response signals (e.g., system information block type 1 (SIB1)).

The following two methods are considered as a possible method of transmitting response signals in uplink when a terminal receives downlink assignment control information via a PDCCH and receives downlink data.

One is a method to transmit response signals using a PUCCH resource associated in a one-to-one correspondence with a beginning CCE index $n_{CCE}$ (or $n_{CCE}+1$ adjacent thereto) of a control channel element (CCE) occupied by the PDCCH (i.e., implicit signaling) (hereinafter, method 1). More specifically, when DCI intended for a terminal served by a base station is allocated in a PDCCH region, each PDCCH occupies a resource consisting of one or a plurality of contiguous CCEs. In addition, as the number of CCEs occupied by a PDCCH (i.e., the number of aggregated CCEs: CCE aggregation level), one of aggregation levels 1, 2, 4 and 8 is selected according to the number of information bits of the assignment control information or a propagation path condition of the terminal, for example.

The other method is to previously report a PUCCH resource to each terminal from a base station (i.e., explicit signaling) (hereinafter, method 2). To put it differently, each terminal transmits response signals using the PUCCH resource previously indicated by the base station in method 2.

In method 2, PUCCH resources common to a plurality of terminals (e.g., four PUCCH resources) may be previously indicated to the terminals from a base station. For example, terminals may employ a method to select one PUCCH resource to be actually used, on the basis of a transmit power control (TPC) command of two bits included in DCI in SCell. In this case, the TPC command is called an ACK/NACK resource indicator (ARI). Such a TPC command allows a certain terminal to use an explicitly signaled PUCCH resource in a certain frame while allowing another terminal to use the same explicitly signaled PUCCH resource in another subframe in the case of explicit signaling.

Regarding PUCCH Format 3 and channel selection, which are methods of indicating results of error detection when carrier aggregation is applied, a method of determining PUCCH resources will be described with reference to FIGS. 5A and 5B and FIGS. 6A and 6B.

In PUCCH Format 3, as shown in FIG. 5B, a terminal indicates results of error detection corresponding to a plurality of downlink data items for each downlink component carrier received in a maximum of five downlink component carriers to a base station using PUCCH Format 3 resources or PUCCH Format 1b resources. To be more specific, the base station indicates a TPC command of PUCCH in a field including a 2-bit TPC command (also referred to as "TPC field") with a PDCCH that specifies the PDSCH of PCell. That is, this field is not used as an ARI. The base station indicates a PUCCH resource (PUCCH Format 1b resource) associated in a one-to-one correspondence with the beginning CCE index $n_{CCE}$ of the CCE occupied by the PDCCH. Moreover, the base station previously sets four PUCCH resources (PUCCH Format 3 resources) for the terminal and indicates an ARI with 2 bits of the TPC field in the PDCCH that specifies the PDSCH of SCell. That is, this field is not used as a TPC command of PUCCH. Note that in FIG. 5B, the ARI included in the PDCCH that specifies the PDSCH of SCell is referred to as ARI1 for convenience. The terminal determines which resource of the previously set four PUCCH resources (PUCCH Format 3 resources) should be used for PUCCH transmission according to an ARI indicated by the PDCCH. Note that the base station indicates the same value to the terminal as the value of the ARI included in the PDCCH specifying the PDSCHs of a plurality of SCells. This allows the terminal to always determine a single PUCCH Format 3 resource.

In PUCCH Format 3, when detecting a PDCCH specifying the PDSCH of at least one SCell, the terminal indicates results of error detection (in the FDD system, a maximum of 10 bits (=5 CCs×2 CWs)) to the base station using the above-described PUCCH Format 3 resources. On the other hand, when detecting only a PDCCH specifying the PDSCH of PCell, the terminal indicates results of error detection (a maximum of 2 bits (=1 CC×2 CWs)) to the base station using a PUCCH Format 1b resource associated in a one-to-one correspondence with the beginning CCE index $n_{CCE}$ of the PDCCH.

The PUCCH Format 1b resource is a PUCCH resource optimized for transmission of results of error detection of up to a maximum of 2 bits and can also be orthogonalized with a maximum of 48 resources. While the PUCCH Format 3 resource is a PUCCH resource optimized for transmission of more results of error detection, it can orthogonalize only up to a maximum of 4 resources. When the number of bits of results of error detection is small, using PUCCH resources optimized for a smaller number of bits of results of error detection allows the PUCCH resources to be orthogonalized to more resources and thereby increases the utilization efficiency of PUCCH resources. Moreover, required PUCCH transmission power at the terminal necessary to satisfy required quality in the base station can also be reduced.

Furthermore, when detecting only a PDCCH that specifies a PDSCH of PCell, the terminal indicates results of error detection to the base station using a PUCCH Format 1b resource associated in a one-to-one correspondence with the beginning CCE index $n_{CCE}$ of the PDCCH, whereby, results of error detection for at least PDSCH of PCell can be indicated without inconsistency between the base station and the terminal even for a period during which the understanding of the setting of the number of CCs differs between the base station and the terminal (hereinafter may be expressed as "supporting LTE fallback").

To be more specific, there is a period during which the understanding of the number of CCs configured in the terminal differs between the base station and the terminal (uncertainty period or misalignment period). The base station indicates, to the terminal, a message indicating a reconfiguration so as to change the number of CCs (e.g., from 1 CC to 2 CCs or vice versa) and, upon reception of the message, the terminal understands that the number of CCs has been changed and indicates, to the base station, a message indicating completion of the reconfiguration of the number of CCs. The period in which the understanding about the number of CCs configured for a terminal is different between a base station and the terminal stems from the fact that the base station understands, upon reception of the message, for the first time, that the number of CCs configured for the terminal has been changed. In a case where the terminal detects only a PDCCH specifying the PDSCH of PCell in common before and after the change of the number of CCs (e.g., FIG. 5A and FIG. 5B or FIG. 6A and FIG. 6B), if the terminal operates so as to use a PUCCH Format 1b resource associated in a one-to-one correspondence with the beginning CCE index $n_{CCE}$ of the PDCCH, the terminal can indicate results of error detection for at least PDSCH of PCell to the base station without inconsistency (that is, supporting LTE fallback) even for a period during which the understanding of the number of CCs differs.

In channel selection, as shown in FIG. 6B, the terminal indicates results of error detection corresponding to a plurality of downlink data items for each downlink component carrier received in a maximum of two downlink component carriers to the base station using four PUCCH Format 1b resources. In channel selection, not only symbol points used for response signals but also PUCCH Format 1b resources to which response signals are mapped are changed in accordance with a pattern (combination of ACK/NACK) of the results of error detection regarding a plurality of downlink data items. In channel selection, the base station indicates a TPC command of PUCCH in a field including a 2-bit TPC command (also referred to as "TPC field") in a PDCCH of PCell. That is, this field is not used as an ARI. The base station specifies the PUCCH resources (PUCCH Format 1b resources) associated in a one-to-one correspondence with the beginning CCE index $n_{CCE}$ of the CCE occupied by the PDCCH and CCE index $n_{CCE}+1$ adjacent thereto respectively (PUCCH resources 0 and 1 in FIGS. 6A and 6B). The base station previously sets four PUCCH resource pairs (PUCCH Format 1b resource pairs) for the terminal and indicates an ARI using 2 bits of the TPC field in a PDCCH of SCell. That is, this field is not used as a TPC command of PUCCH. In FIGS. 6A and 6B, an ARI included in a PDCCH of SCell is referred to as ARI1 for convenience. The terminal determines one resource pair of the four previously set PUCCH resource pairs (PUCCH Format 1b resource pairs) according to the ARI indicated by the PDCCH (PUCCH resources 2 and 3 in FIG. 6B).

In recent years, it has become common to transmit not only audio data but also large-volume data, such as still image data and moving image data in cellular mobile communication systems in response to spread of multimedia information. In LTE-Advanced (Long Term Evolution Advanced), studies are being actively conducted on achieving high transmission rates using wide radio bands, multiple-input multiple-output (MIMO) transmission technique and interference control technique.

In consideration of the fact that various devices for M2M (machine to machine) communication or the like are introduced as radio communication terminals and the number of terminals multiplexed by a MIMO transmission technique, there is concern about a shortage of resources in a region to which PDCCH (Physical Downlink Control CHannel: downlink control channel) used for control signals are mapped (that is, "PDCCH region"). When control signals (PDCCHs) cannot be mapped due to this shortage of resources, data cannot be assigned to terminals. For this reason, even when there are resource regions available for data mapping, they cannot be used, and the system throughput may decrease.

As a method of solving this shortage of resources, studies are being carried out on a possibility of arranging control signals intended for terminals served by the base station in PDSCH regions as well. Resource regions in which control signals intended for terminals served by the base station are mapped (resource regions available to both a control channel and a data channel) are called "enhanced PDCCH (ePDCCH) regions." Thus, by mapping control signals in the data region (that is, ePDCCH), it is possible to achieve transmission power control over control signals transmitted to terminals located in the vicinity of a cell edge or control over interference provided with transmitted control signals to other cells or control over interference provided from the other cells to the own cell.

In LTE, DL assignment indicating downlink data assignment and UL grant indicating uplink data assignment are transmitted by PDCCHs.

In LTE-Advanced, DL assignment and UL grant are assigned to an ePDCCH as well as PDCCH. Studies are being carried out on a possibility of dividing resources to which DL assignment is mapped and resources to which UL grant is mapped in an ePDCCH in the frequency domain.

Studies are being carried out on a possibility of "localized assignment" whereby ePDCCHs are collectively assigned at positions close to each other in a frequency band and "distributed assignment" whereby ePDCCHs are assigned in a frequency band in a distributed manner, as ePDCCH assignment methods (e.g., see FIG. 7).

CITATION LIST

Non-Patent Literature

NPL 1
3GPP TS 36.211 V10.4.0, "Physical Channels and Modulation (Release 10)," December 2011
NPL 2
3GPP TS 36.212 V10.5.0, "Multiplexing and channel coding (Release 10)," March 2012
NPL 3
3GPP TS 36.213 V10.5.0, "Physical layer procedures (Release 10)," March 2012
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009

NPL 5

Ericsson and ST-Ericsson, "A/N transmission in the uplink for carrier aggregation," R1-100909, 3GPP TSG-RAN WG1 #60, February 2010

NPL 6

ZTE, 3GPP RAN1 meeting #57, R1-091702, "Uplink Control Channel Design for LTE-Advanced," May 2009

NPL 7

Panasonic, 3GPP RAN1 meeting #57, R1-091744, "UL ACK/NACK transmission on PUCCH for Carrier aggregation," May 2009

SUMMARY OF INVENTION

Technical Problem

As described above, LTE-Advanced defines the method of determining PUCCH resources when indicating DL assignment (that is, PDCCH indicating PDSCH) in a PDCCH region, whereas the method of determining PUCCH resources when indicating DL assignment in an ePDCCH region has not been discussed so far.

An object of the present invention is to provide a method of determining a PUCCH resource used to indicate a response signal indicating a result of error detection on downlink data when ARQ is applied in communication using an uplink component carrier and a plurality of downlink component carriers associated with the uplink component carrier and when downlink data assignment is specified by an ePDCCH.

Solution to Problem

A terminal apparatus according to an aspect of the present invention is a terminal apparatus that communicates with a base station apparatus using a plurality of component carriers and that receives a downlink control signal in a first resource region usable for both a downlink control channel and a downlink data channel or a second resource region usable for a downlink control channel, the terminal apparatus including: a downlink control signal detection section that detects a downlink control signal assigned to the first resource region or the second resource region, for each of the component carriers; a receiving section that receives downlink data items using the plurality of component carriers, respectively; an error detection section that detects an error of each of the downlink data items; a generating section that generates a response signals using a result of error detection on each of the downlink data items, the result of error detection being obtained by the error detection section; and a control section that transmits the response signal to the base station apparatus, in which the control section switches between resource regions of an uplink communication control channel for transmitting the response signal, in accordance with whether the downlink control signal detection section detects the downlink control signal in the first resource region or the second resource region.

A transmission method according to an aspect of the present invention is a transmission method for a terminal apparatus that communicates with a base station apparatus using a plurality of component carriers and that receives a downlink control signal in a first resource region usable for both a downlink control channel and a downlink data channel or a second resource region usable for a downlink control channel, the transmission method including: detecting a downlink control signal assigned to the first resource region or the second resource region, for each of the component carriers; receiving downlink data items using the plurality of component carriers, respectively; detecting an error of each of the downlink data items; generating a response signal using an obtained result of error detection on each of the downlink data items; and transmitting the response signal to the base station apparatus, in which switching between resource regions of an uplink communication control channel for transmitting the response signal is performed in accordance with whether the downlink control signal is detected in the first resource region or the second resource region.

Advantageous Effects of Invention

According to the present invention, it is made possible to determine a PUCCH resource used to indicate a response signal indicating a result of error detection on downlink data when ARQ is applied in communication using an uplink component carrier and a plurality of downlink component carriers associated with the uplink component carrier and when downlink data assignment is specified by an ePDCCH.

BRIEF DESCRIPTION OF DRAWINGS

FIGS. 5A and 5B are diagrams illustrating a method of determining PUCCH resources in PUCCH Format 3 when DL assignment is indicated by PDCCH;

FIGS. 6A and 6B are diagrams illustrating a method of determining PUCCH resources in channel selection when DL assignment is indicated by PDCCH;

FIGS. 11A and 11B are diagrams provided for describing a method of determining PUCCH resources according to Embodiment 1 of the present invention;

FIGS. 12A and 12B are diagrams provided for describing a method of determining PUCCH resources according to Embodiment 2 of the present invention;

FIGS. 13A to 13C are diagrams provided for describing operation when PDCCH and ePDCCH are used in combination according to Embodiment 3 of the present invention;

FIGS. 14A to 14C are diagrams provided for describing a method of determining PUCCH resources according to Embodiment 3 of the present invention;

FIGS. 15A to 15D are diagrams provided for describing operation when PDCCH and ePDCCH are used in combination according to Embodiment 4 of the present invention; and FIGS. 16A to 16D are diagrams provided for describing a method of determining PUCCH resources according to Embodiment 4 of the present invention.

Hereinafter, embodiments of the present invention will be described in detail with reference to the accompanying drawings. Throughout the embodiments, the same elements are assigned the same reference numerals and any duplicate description of the elements is omitted.

DESCRIPTION OF EMBODIMENTS

Embodiment 1

Figure 1:
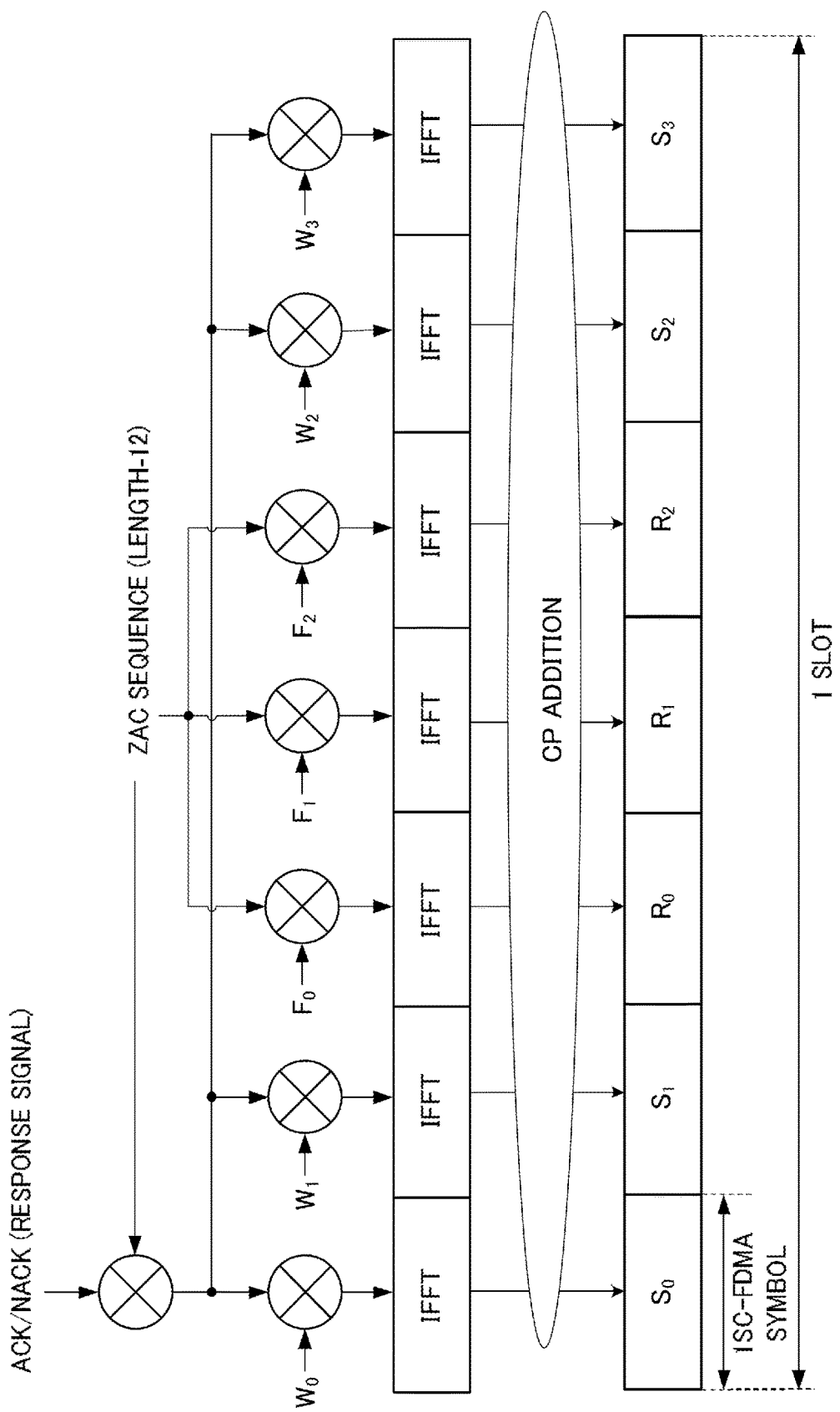
FIG. 1 is a diagram illustrating a method of spreading response signals and reference signals.
Figure 2:
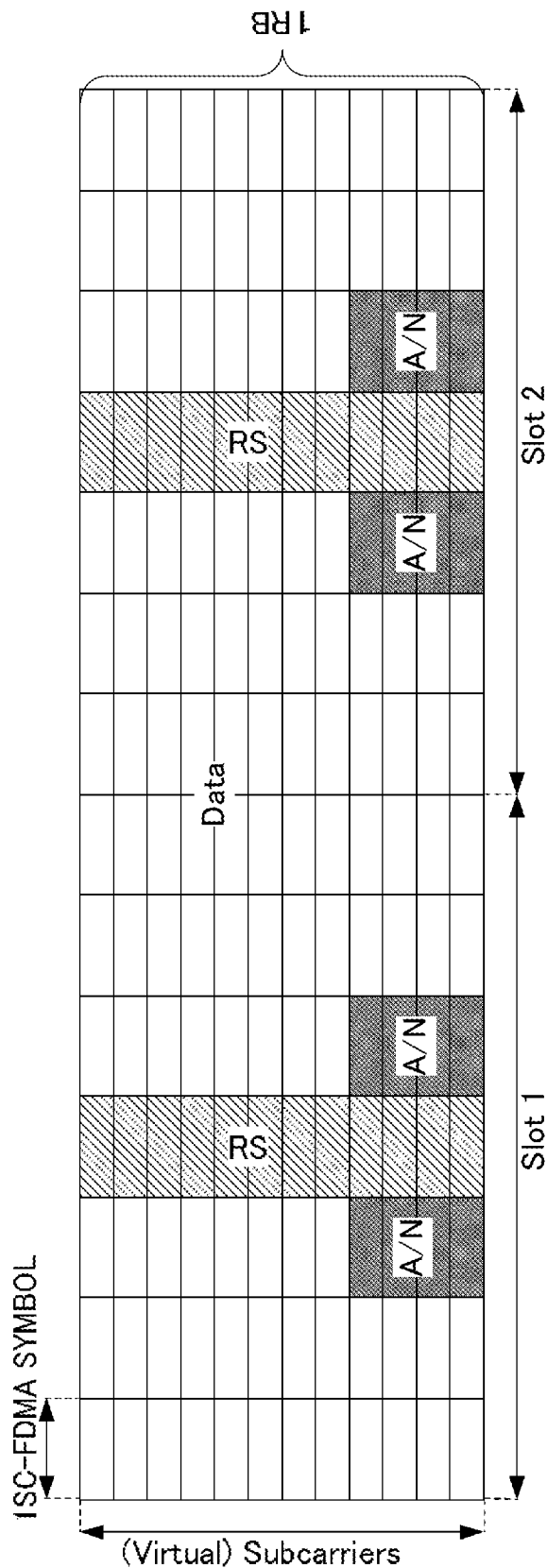
FIG. 2 is a diagram illustrating an operation related to a case where TDM is applied to response signals and uplink data on PUSCH resources.
Figure 3B:
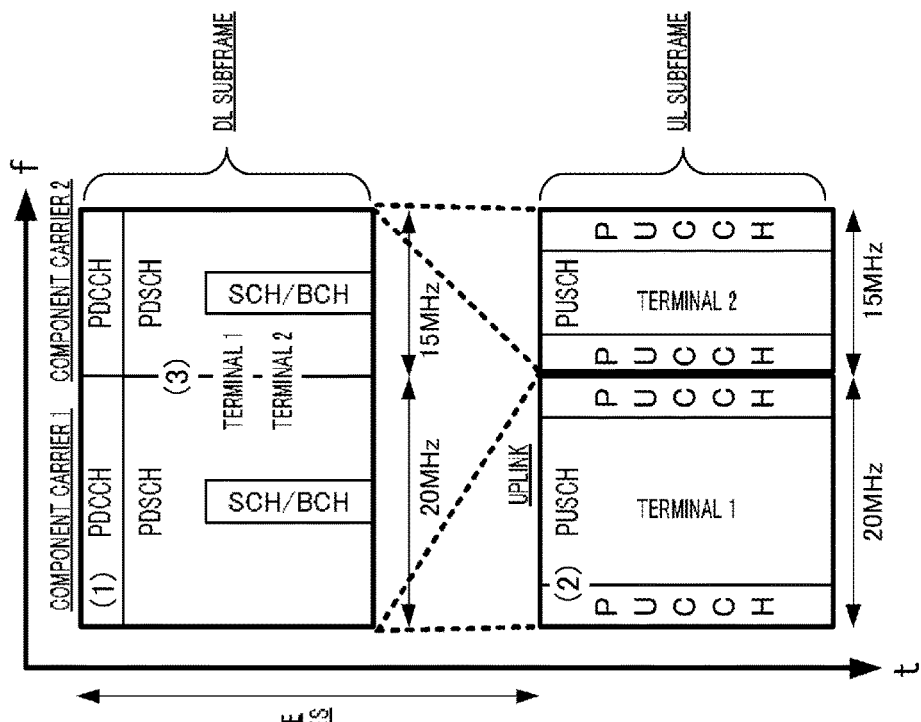
FIGS. 3A and 3B are diagrams provided for describing asymmetric carrier aggregation and a control sequence applied to individual terminals.
Figure 3A:
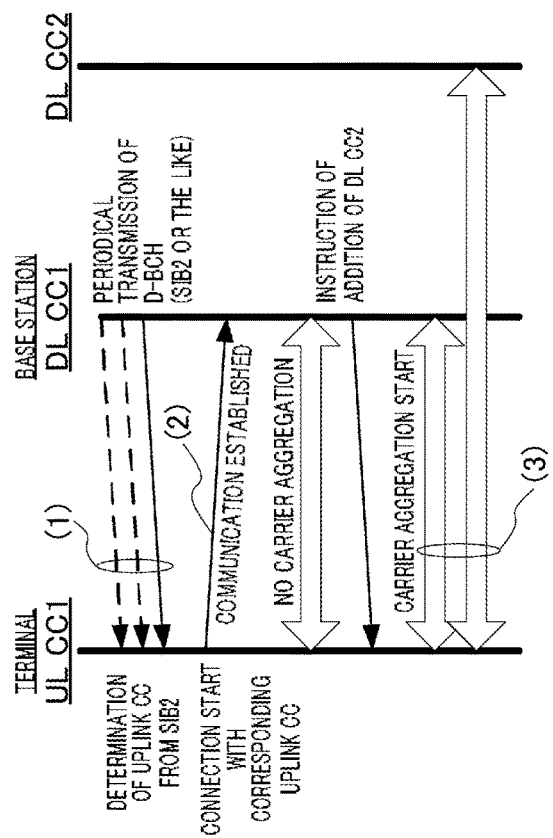
Figure 4:
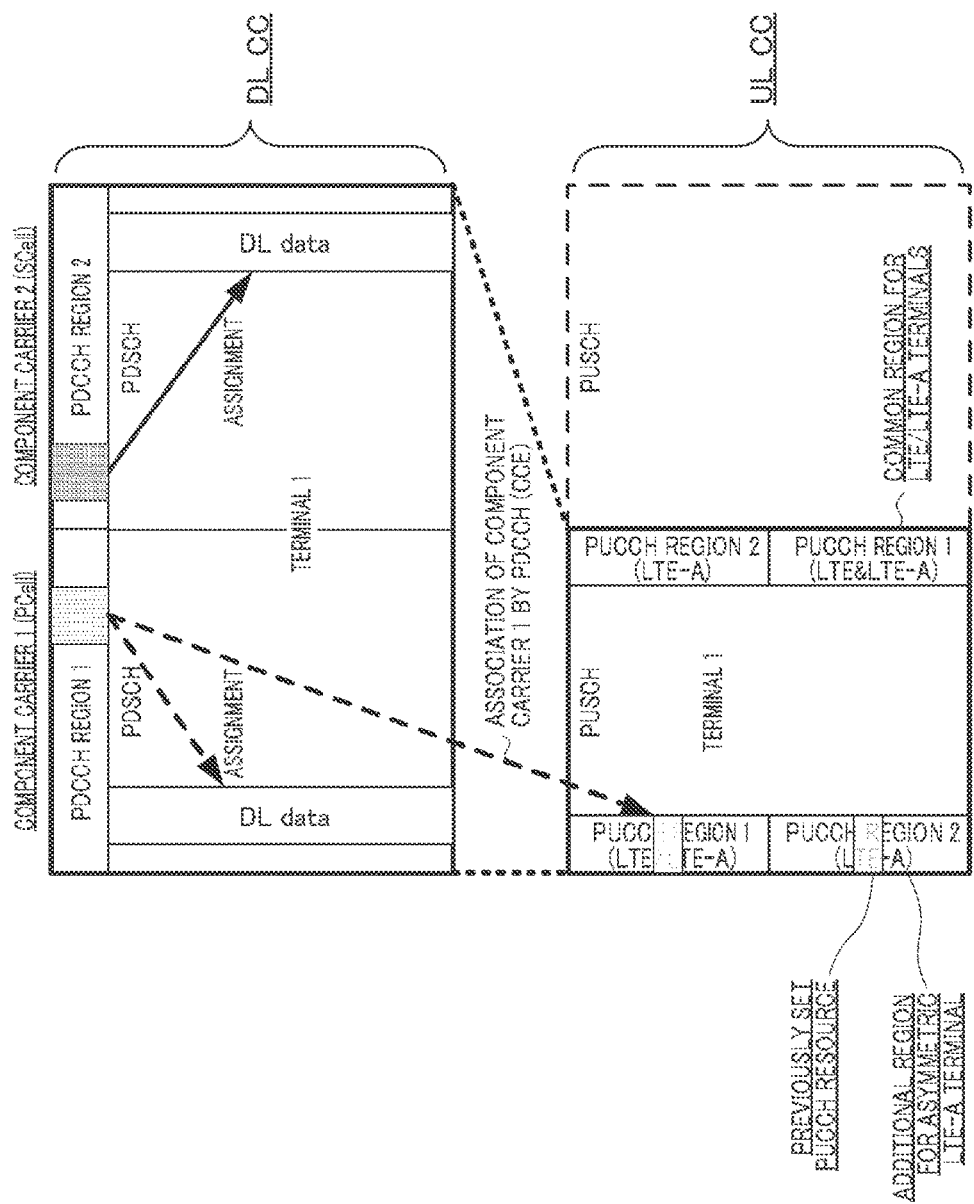
FIG. 4 is a diagram provided for describing a method of determining PUCCH resources in carrier aggregation.
Figure 7:
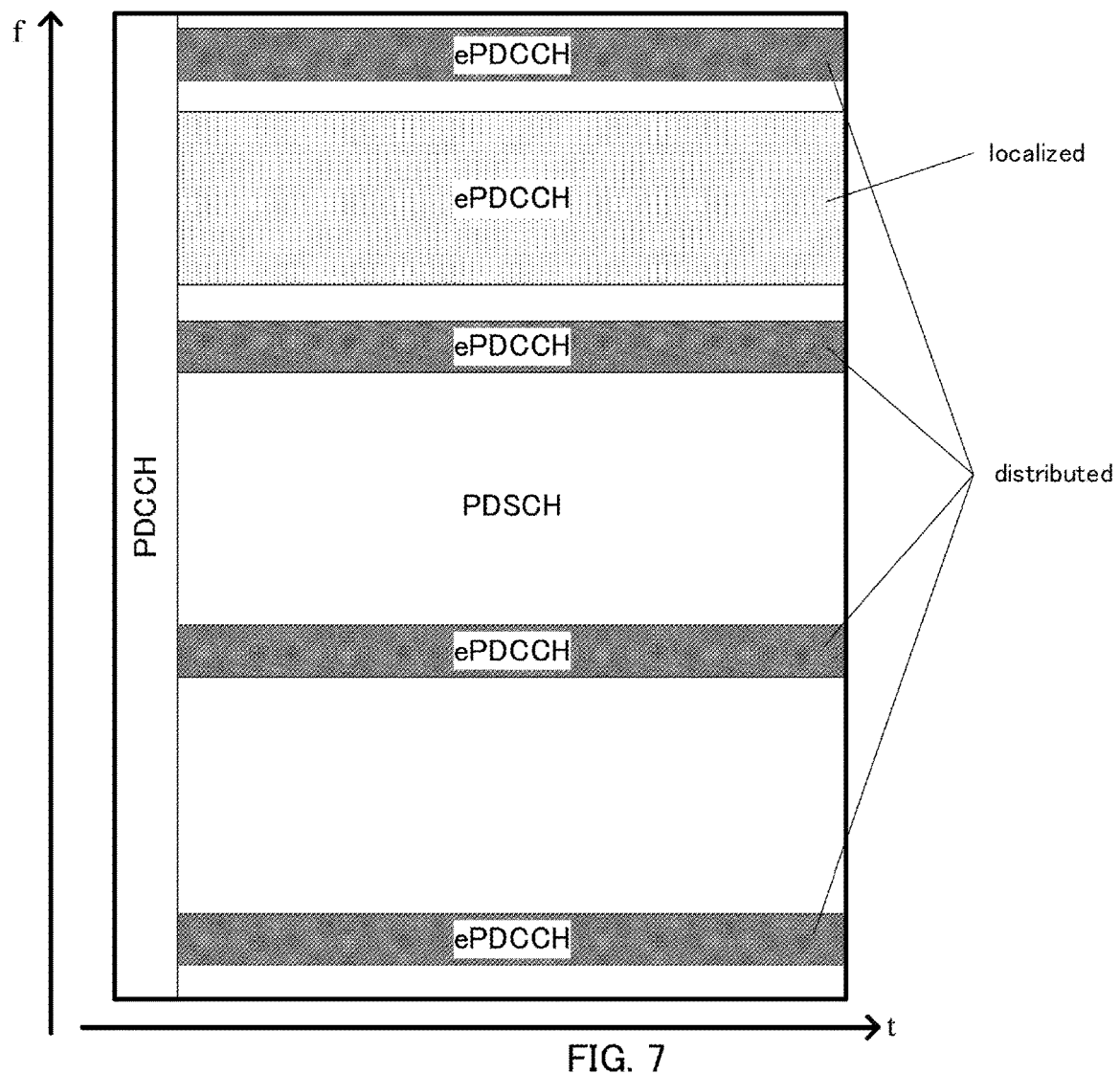
FIG. 7 is a diagram illustrating an example of a method of assigning ePDCCHs.
Figure 8:
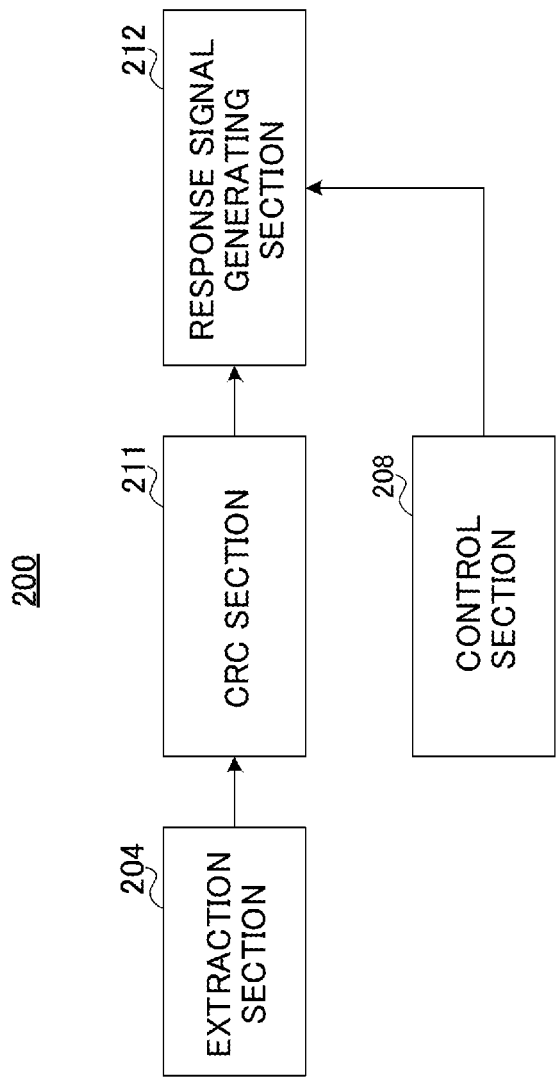
FIG. 8 is a block diagram illustrating a main configuration of a terminal according to Embodiment 1 of the present invention.

FIG. 8 is a main configuration diagram of terminal 200 according to the present embodiment. Terminal 200 communicates with base station 100 using a plurality of component carriers including a first component carrier and a second component carrier. In terminal 200, extraction section 204 receives downlink data assignment in a PDCCH region or ePDCCH region and downlink data items in a PDSCH region specified by the downlink data assignment respectively using the plurality of component carriers. In addition, CRC section 211 detects an error of each downlink data item, response signal generating section 212 generates a response signal using results of error detection on each downlink data item obtained in CRC section 211, and control section 208 transmits the response signal to base station 100. However, control section 208 determines PUCCH resources used for transmission of response signals based on which one of the PDCCH region and ePDCCH region is used to receive the downlink data assignment.

[Configuration of Base Station]

Figure 9:
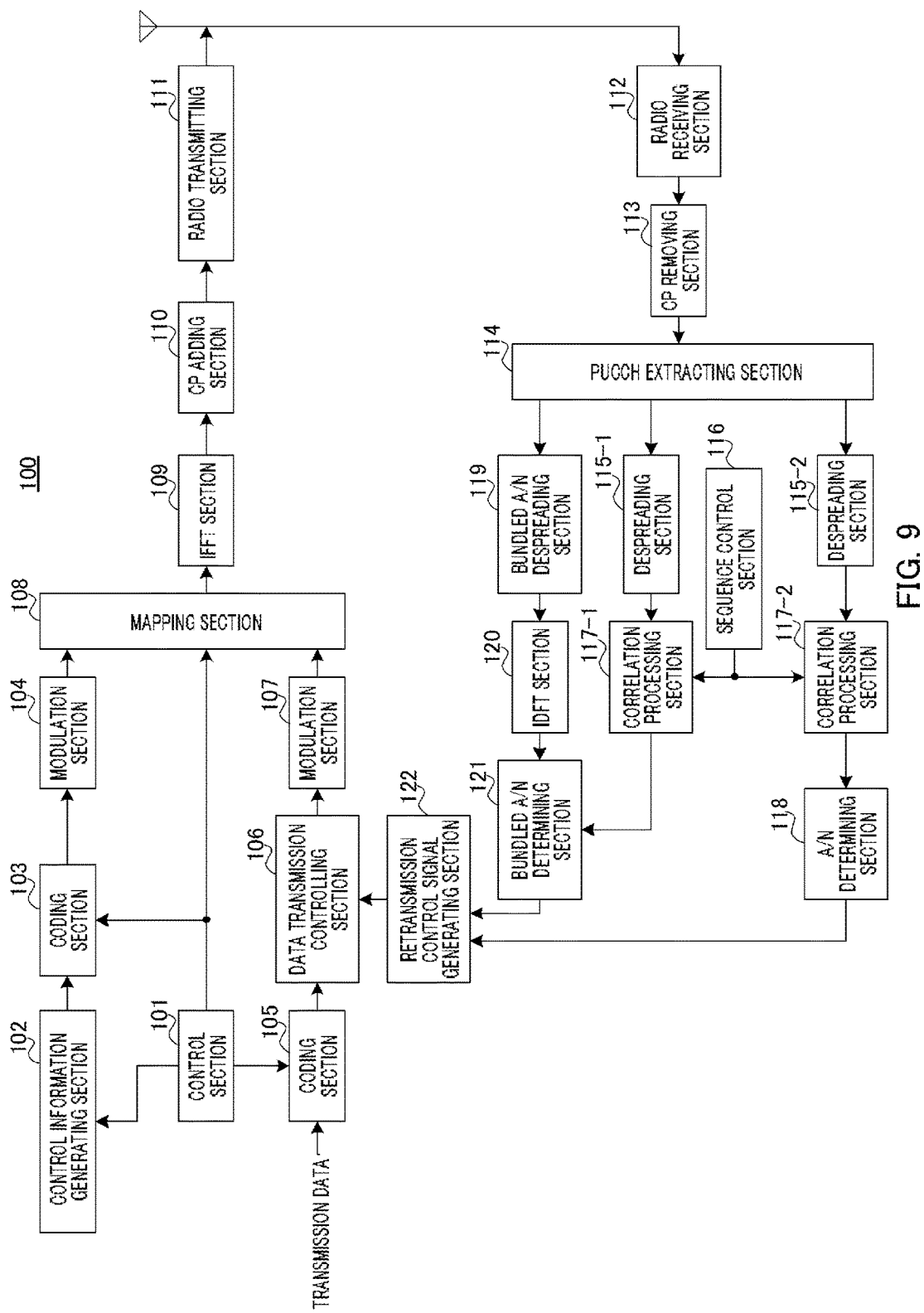
FIG. 9 is a block diagram illustrating a configuration of a base station according to Embodiment 1 of the present invention.

FIG. 9 is a block diagram illustrating a configuration of base station 100 according to Embodiment 1 of the present invention. In FIG. 9, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence control section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PDCCH or ePDCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2 CCH described above. More specifically, the downlink control information assignment resources are each formed of one or a plurality of CCEs.

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)."

Coding section 103 encodes the control information using the coding rate received from control section 101 and outputs the coded control information to modulation section 104.

Modulation section 104 modulates the coded control information and outputs the resultant modulation signal to mapping section 108.

Coding section 105 uses the transmission data (i.e., downlink data) for each destination terminal 200 and the coding rate information from control section 101 as input and encodes and outputs the transmission data to data transmission controlling section 106. However, when a plurality of downlink component carriers are assigned to destination terminal 200, coding section 105 encodes each transmission data item to be transmitted on a corresponding one of the downlink component carriers and outputs the coded transmission data item to data transmission controlling section 106.

Data transmission controlling section 106 outputs the coded transmission data to modulation section 107 and also keeps the coded transmission data at the initial transmission. Data transmission controlling section 106 keeps the coded transmission data for each destination terminal 200. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signal of the control information received from modulation section 104 to the resource indicated by the downlink control information assignment resource received from control section 101 and outputs the resultant modulation signal to IFFT section 109.

Mapping section 108 maps the modulation signal of the transmission data received from modulation section 107 to the resource (i.e., PDSCH (i.e., downlink data channel)) indicated by the downlink data assignment resource received from control section 101 (i.e., information included in the control information) and outputs the resultant modulation signal to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signal or reference signal transmitted from terminal 200, and performs reception processing such as down-conversion, A/D conversion and/or the like on the uplink response signal or reference signal.

CP removing section 113 removes the CP added to the uplink response signal or reference signal from the uplink response signal or reference signal that have undergone the reception processing.

PUCCH extracting section 114 extracts, from the PUCCH signal included in the received signal, the signal in the PUCCH region corresponding to the bundled ACK/NACK resource previously indicated to terminal 200. The bundled ACK/NACK resource herein refers to a resource used for transmission of the bundled ACK/NACK signal and adopting the DFT-S-OFDM format structure. More specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the extracted reference signal part to despreading section 115-1.

In addition, PUCCH extracting section 114 extracts, from the PUCCH signals included in the received signals, a plurality of PUCCH regions corresponding to an A/N resource (or also referred to as "PUCCH resource") associated with a CCE that has been occupied by the PDCCH used for transmission of the downlink assignment control information (DCI), and corresponding to a plurality of A/N resources previously indicated to terminal 200. The A/N resource herein refers to the resource to be used for transmission of an A/N. Moreover, PUCCH extracting section 114 determines an A/N resource based on whether the channel used for transmission of the downlink assignment control information (DCI) is PDCCH or ePDCCH. Details of the method of determining A/N resources will be described later.

Furthermore, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signal is received on the resource selected from the PUCCH resource associated with the CCE and the specific PUCCH resource previously indicated to terminal 200.

Sequence control section 116 generates a base sequence (i.e., length-12 ZAC sequence) that may be used for spreading each of the A/N indicated from terminal 200, the reference signal for the A/N, and the reference signal for the bundled ACK/NACK signals. In addition, sequence control section 116 identifies a correlation window corresponding to a resource on which the reference signal may be assigned (hereinafter, referred to as "reference signal resource") in PUCCH resources that may be used by terminal 200. Sequence control section 116 outputs the information indicating the correlation window corresponding to the reference signal resource on which the reference signal may be assigned in bundled ACK/NACK resource and the base sequence to correlation processing section 117-1. Sequence control section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

More specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

Specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds each correlation value between the signal received from despreading section 115-2 and base sequences that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when bundled A/N determining section 121 thus determines that the correlation value received from correlation processing section 117-1 is smaller than a threshold and that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information received from bundled A/N determining section 121, the information received from A/N determining section 118 and the information indicating a group number set to terminal 200, and generates a retransmission control signal based on the result of determination. Specifically, when determining that downlink data transmitted on a certain downlink component carrier needs to be retransmitted, retransmission control signal generating section 122 generates retransmission control signals indicating a retransmission command for the downlink data and outputs the retransmission control signal to data transmission controlling section 106. In addition, when determining that the downlink data transmitted on a certain downlink component carrier does not need to be retransmitted, retransmission control signal generating section 122 generates a retransmission control signal indicating not to retransmit the downlink data transmitted on the downlink component carrier and outputs the retransmission control signal to data transmission controlling section 106.

[Configuration of Terminal]

Figure 10:
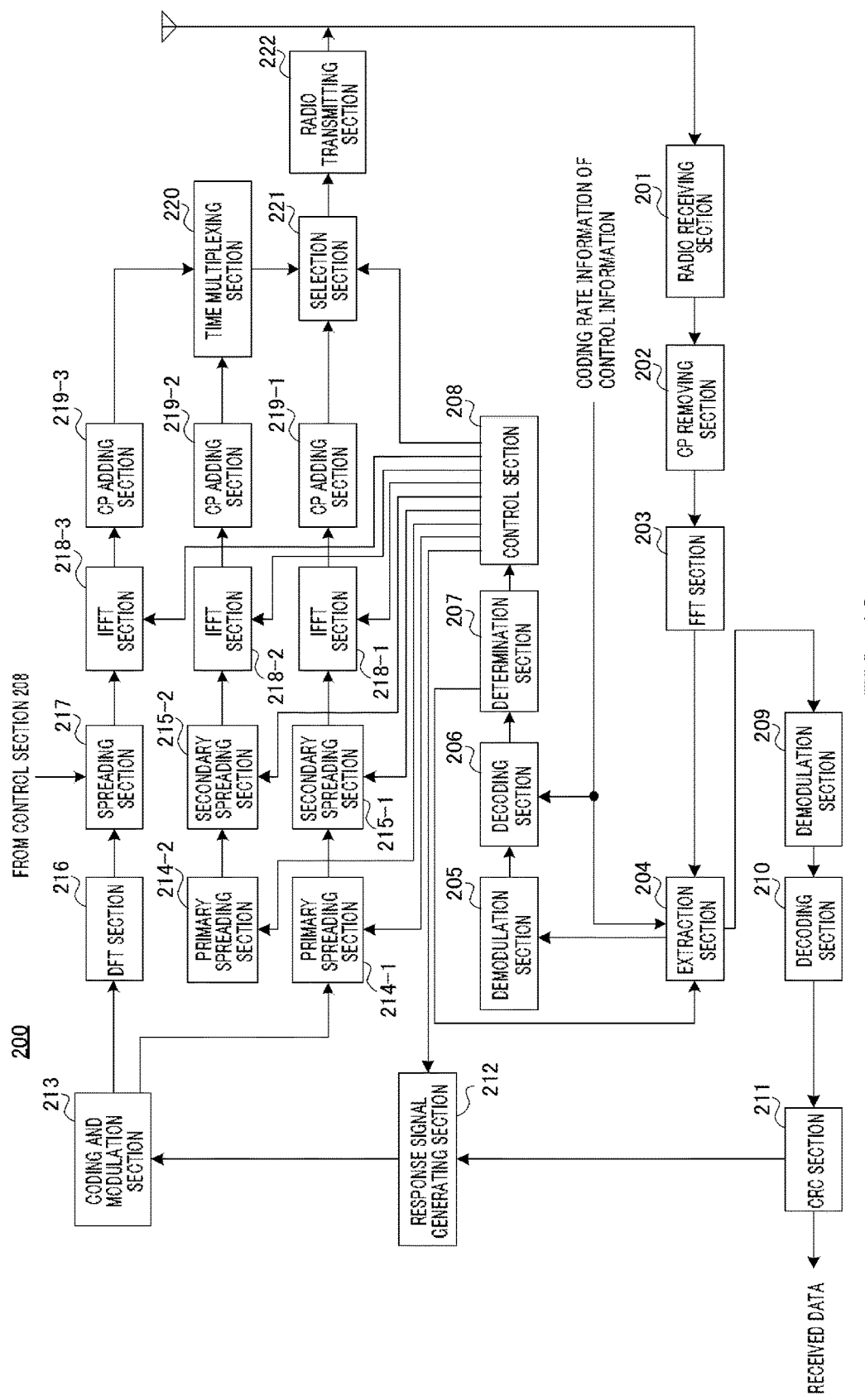
FIG. 10 is a block diagram illustrating a configuration of a terminal according to Embodiment 1 of the present invention.

FIG. 10 is a block diagram illustrating a configuration of terminal 200 according to Embodiment 1. In FIG. 10, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. Note that, the received OFDM signals include PDSCH signals assigned to a resource in PDSCH (i.e., downlink data), or downlink control signals assigned to a resource in PDCCH and downlink control signals assigned to a resource in ePDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH or ePDCCH) in accordance with coding rate information to be received. Specifically, the number of CCEs (or eCCEs) forming a downlink control information assignment resource varies depending on the coding rate. Thus, extraction section 204 uses the number of CCEs that corresponds to the coding rate as units of extraction processing, and extracts downlink control channel signal. In addition, the downlink control channel signal is extracted for each downlink component carrier. The extracted downlink control channel signal is outputted to demodulation section 205.

Extraction section 204 extracts downlink data (i.e., downlink data channel signal (i.e., PDSCH signal)) from the received signal on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signal received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that an ACK/NACK signal will be generated (or is present). Moreover, when detecting the control information intended for terminal 200 from the PDCCH region, determination section 207 outputs information on a CCE that has been occupied by the PDCCH to control section 208.

Control section 208 determines an A/N resource based on whether the channel used for transmission of downlink assignment control information (DCI) is a PDCCH or ePDCCH. Details of the method of determining A/N resources will be described later. Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously indicated by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

Control section 208 determines an A/N resource based on whether the channel used for transmission of the downlink assignment control information (DCI) is a PDCCH or ePDCCH. Details of the method of determining A/N resources will be described later.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously indicated by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates a response signal on the basis of the reception condition of downlink data (i.e., result of error detection on downlink data) on each downlink component carrier received from CRC section 211 and information indicating the previously set group number. Specifically, when instructed to generate the bundled ACK/NACK signal by control section 208, response signal generating section 212 generates the bundled ACK/NACK signal including the results of error detection for the respective component carriers as individual data items. Meanwhile, when instructed to generate ACK/NACK signals by control section 208, response signal generating section 212 generates an ACK/NACK signal of one symbol. Response signal generating section 212 outputs the generated response signal to coding and modulation section 213.

Upon reception of the bundled ACK/NACK signal, coding and modulation section 213 encodes and modulates the received bundled ACK/NACK signal to generate the modulation signal of 12 symbols and outputs the modulation signal to DFT section 216. In addition, upon reception of the ACK/NACK signal of one symbol, coding and modulation section 213 modulates the ACK/NACK signal and outputs the modulation signal to primary-spreading section 214-1.

Primary-spreading sections 214-1 and 214-2 corresponding to the A/N resource and the reference signal resource of bundled ACK/NACK resource spread ACK/NACK signals or reference signals using a base sequence corresponding to the resource, in accordance with an instruction from control section 208, and outputs the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

IFFT sections 218-1, 218-2 and 218-3 perform IFFT processing on the received signals in association with the frequency positions where the signals are to be allocated, based on an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes, on the bundled ACK/NACK resource, the bundled ACK/NACK signal received from CP adding section 219-3 (i.e., signal transmitted using the data part of the bundled ACK/NACK resource) and the reference signal of the bundled ACK/NACK resource to be received from CP adding section 219-2, and outputs the multiplexed signal to selection section 221.

Selection section 221 selects one of the bundled ACK/NACK resource received from time-multiplexing section 220 and the A/N resource received from CP adding section 219-1 and outputs the signal assigned to the selected resource to radio transmitting section 222.

Radio transmitting section 222 performs transmission processing such as D/A conversion, amplification and up-conversion and/or the like on the signal received from selection section 221 and transmits the resultant signal to base station 100 via an antenna.

[Operations of Base Station 100 and Terminal 200]

A description will be provided regarding operations of base station 100 and terminal 200 each configured in the manner described above.

The method of determining PUCCH resources according to the present embodiment will be described with reference to FIGS. 11A and 11B. The present embodiment will describe a method of determining PUCCH resources in a case where terminal 200 does not configure carrier aggregation (FIG. 11A) and in a case where terminal 200 configures carrier aggregation and PUCCH Format 3 (FIG. 11B) when DL assignment is indicated by ePDCCH.

In PUCCH Format 3 of the present embodiment, results of error detection corresponding to a plurality of downlink data items for each downlink component carrier received on a maximum of 5 downlink component carriers are indicated to base station 100 using PUCCH Format 3 resources or PUCCH Format 1b resources as shown FIG. 11B. To be more specific, base station 100 indicates ARI (ARI3) in the TPC field by the ePDCCH specifying the PDSCH of PCell. Terminal 200 determines which resource of the four previously set PUCCH resources (PUCCH Format 1b resources) is to be used for PUCCH transmission according to the ARI indicated by the ePDCCH. On the other hand, base station 100 indicates the ARI (ARI2) in the TPC field by the ePDCCH specifying the PDSCH of SCell. Terminal 200 determines which resource of the four previously set PUCCH resources (PUCCH Format 3 resources) is to be used for PUCCH transmission according to the ARI indicated by the ePDCCH.

In PUCCH Format 3 according to the present embodiment, when the terminal detects an ePDCCH specifying the PDSCH of at least one SCell as in the case of the operation using PDCCH, results of error detection are indicated to base station 100 using the above PUCCH Format 3 resources. On the other hand, when the terminal detects only the ePDCCH specifying the PDSCH of PCell, results of error detection are indicated to base station 100 using the above PUCCH Format 1b resources.

The PUCCH Format 1b resource is a PUCCH resource optimized for transmission of results of error detection of up to a maximum of 2 bits and can be orthogonalized with a maximum of 48 resources. While the PUCCH Format 3 resource is a PUCCH resource optimized for transmission of more results of error detection, the PUCCH Format 3 can be orthogonalized with only up to a maximum of 4 resources. Therefore, according to the present embodiment, when the number of bits of results of error detection is small as in the case of the operation using PDCCH, using PUCCH resources optimized to the number of bits of a fewer results of error detection allows the PUCCH resources to be orthogonalized with more resources and can increase the utilization efficiency of the PUCCH resources. Furthermore, PUCCH transmission power in the terminal necessary to satisfy required quality in the base station can be reduced.

According to the present embodiment, the method of determining a PUCCH format used by ePDCCH is the same as the operation using a PDCCH. That is, when the terminal detects a PDCCH or ePDCCH specifying the PDSCH of at least one SCell, the terminal indicates results of error detection to the base station using PUCCH Format 3. On the other hand, when detecting only one of PDCCH and ePDCCH specifying the PDSCH of PCell, the terminal indicates results of error detection to the base station using PUCCH Format 1b. The method of generating response signals from results of error detection for each PDSCH differs only depending on the PUCCH format (that is, PUCCH Format 3 or PUCCH Format 1b). In PUCCH Format 3, response signals of a maximum of 10 bits (=5 CCs×2 CWs) are generated by combining the respective results of error detection, whereas in PUCCH Format 1b, response signals of a maximum of 2 bits (=1 CC×2 CWs) are generated by combining results of error detection of the PDSCH of PCell. For this reason, the processing involved in the generation of response signals can be commonly used for the operation using PDCCH and the operation using ePDCCH. In other words, whether PDSCH is specified by a PDCCH or ePDCCH has nothing to do with processing of generating response signals, and it is the presence or absence of assignment of PDSCH in each cell that has to do with the processing of generating response signals. This makes it possible to simplify the configurations of the terminal and the base station.

Embodiment 2

As in the case of Embodiment 1, in the present embodiment, a description will be given of a method of indicating PUCCH resources in a case where DL assignment is indicated by ePDCCH when terminal 200 does not set carrier aggregation and when terminal 200 sets carrier aggregation and PUCCH Format 3. The difference from Embodiment 1 lies in ARI (ARI3) specified by the ePDCCH that specifies the PDSCH of PCell and PUCCH resources specified by the ARI.

When carrier aggregation is set in a heterogeneous network environment (HetNet) that combines a cell having a large cell coverage and a cell having a small cell coverage, operating the cell having a large cell coverage as PCell and the cell having a small cell coverage as SCell may be possibly adopted to secure mobility of terminals. In carrier aggregation in such a HetNet environment, a base station covering an SCell is generally located closer to the terminal than a base station covering a PCell. Therefore, it is advantageous for the base station covering an SCell to perform downlink data communication with the terminal in terms of transmission power. For this reason, in carrier aggregation in a HetNet environment, only PCell performs downlink data assignment less frequently. Thus, in the present embodiment, the ARI (ARI3) specified by the ePDCCH that specifies the PDSCH of PCell specifies the same PUCCH resources (PUCCH Format 3 resources) as the ARI (ARI2) specified by the ePDCCH that specifies the PDSCH of SCell.

More specifically, the method of determining PUCCH resources according to the present embodiment will be described with reference to FIGS. 12A and 12B. As shown in FIG. 12B, when carrier aggregation is set, base station 100 indicates the ARI (ARI3) in a TPC field by ePDCCH that specifies the PDSCH of PCell. On the other hand, base station 100 recognizes that the ARI (ARI2) is indicated to the TPC field by ePDCCH that instructs PDSCH of SCell and operates accordingly. In the present embodiment, base station 100 and terminal 200 always use ARI2 and ARI3 as having the same value. Moreover, four previously set PUCCH resources are common so that PUCCH resources indicated by ARI2 and ARI3 are also identical. Terminal 200 determines which one of the four previously set PUCCH resources (PUCCH Format 3 resources) is to be used for PUCCH transmission according to ARI2 and ARI3.

On the other hand, as shown in FIG. 12A, when no carrier aggregation is set, base station 100 indicates ARI (ARI3) in the TPC field by the ePDCCH that specifies the PDSCH of PCell. Terminal 200 determines which one of the four previously set PUCCH resources (PUCCH Format 1b resources) is to be used for PUCCH transmission according to the ARI indicated by the ePDCCH.

As described so far, according to the present embodiment, when carrier aggregation is set, the terminal always transmits a response signal using a PUCCH Format 3 resource, focusing on the fact that PDSCH is less frequently assigned only to PCell. ARI2 and ARI3 are always used as having the same value. Moreover, the four previously set PUCCH resources are made common so that the PUCCH resources indicated by ARI2 and ARI3 also become identical. When no carrier aggregation is set, the terminal transmits response signals using PUCCH Format 1b resources which are PUCCH resources optimized to the number of bits of a fewer results of error detection.

Furthermore, when carrier aggregation is set, always using PUCCH Format 3 resources eliminates the necessity for using PUCCH Format 1b resources when the terminal fails to receive the ePDCCH that specifies the PDSCH of SCell although the base station has assigned both the PDSCHs of PCell and SCell. Therefore, the base station need not secure PUCCH Format 1b resources in preparation for a failure of the terminal to receive the ePDCCH that specifies the PDSCH of SCell and can thereby reduce the PUCCH overhead.

Note that when carrier aggregation is set, if the PDSCH is assigned only to PCell, PUCCH Format 1b resources may be used which are PUCCH resources optimized to the number of bits of a fewer results of error detection in the same way as when carrier aggregation is not set by specifying the PDSCH not by ePDCCH but by PDCCH.

Embodiment 3

Embodiments 1 and 2 have described the method of indicating PUCCH resources when an ePDCCH is used. In actual operations, a PDCCH and ePDCCH may be used in combination in units of cells or subframes. Furthermore, an operation using a cell without PDCCH (a cell that does not support backward compatibility) may also be possible. An operation using a cell that does not support ePDCCH may also be possible. Thus, the present embodiment will show a method of indicating PUCCH resources when a PDCCH and ePDCCH are used in combination in units of cells, in the case of carrier aggregation is set according to Embodiment 2.

In the present embodiment, as shown in FIG. 13A, PDCCH and ePDCCH are used in combination in units of cells or subframes. For example, in subframe #0 (SF#0) in FIG. 13A, base station 100 specifies the PDSCH using the PDCCH in PCell, SCell1 and SCell2, and specifies the PDSCH using the ePDCCH in SCell3 and SCell4. FIG. 13B shows the method of determining PUCCH resources in subframe #0 in FIG. 13A and FIG. 13C shows the method of determining PUCCH resources in subframe #1 in FIG. 13A.

In FIG. 13B, since the PDSCH of PCell is specified by the PDCCH, PUCCH resources (PUCCH Format 1b resources) associated in a one-to-one correspondence with the beginning CCE index $n_{CCE}$ of the CCE occupied by the PDCCH are instructed. The PDSCHs of SCell1 and SCell2 are also specified by the PDCCH, and ARI (ARI1) is indicated to the TPC field by the PDCCH that specifies the PDSCHs. Terminal 200 determines which one of the four previously set PUCCH resources (PUCCH Format 3 resources) is to be used for PUCCH transmission according to the ARI (ARI1) indicated by the PDCCH. Moreover, the PDSCHs of SCell3 and SCell4 are specified by the ePDCCH and ARI (ARI2) is indicated to the TPC field by the ePDCCH that specifies the PDSCHs. Terminal 200 determines which one of the four previously set PUCCH resources (PUCCH Format 3 resources) is to be used for PUCCH transmission according to the ARI (ARI2) indicated by the ePDCCH.

In FIG. 13C, since the PDSCHs of PCell, SCell1 and SCell4 are specified by an ePDCCH, ARI is indicated to the TPC field (ARI3 is indicated to PCell and ARI2 is indicated to SCell1 and SCell4) by the ePDCCH that specifies the PDSCHs. ARI2 and ARI3 are always used as having the same value. Furthermore, the four previously set PUCCH resources are common so that PUCCH resources specified by ARI2 and ARI3 also become identical. Terminal 200 determines which one of the four previously set PUCCH resources (PUCCH Format 3 resources) is to be used for PUCCH transmission according to the ARI (ARI2=ARI3) indicated by the ePDCCH. On the other hand, the PDSCHs of SCell2 and SCell3 are specified by the PDCCH and ARI (ARI1) is indicated to the TPC field by the PDCCH that specifies the PDSCHs. Terminal 200 determines which one of the four previously set PUCCH resources (PUCCH Format 3 resources) is to be used for PUCCH transmission according to the ARI (ARI1) indicated by the PDCCH.

According to FIG. 13B and FIG. 13C, the PUCCH resources determined by ARI1 and the PUCCH resources determined by ARI2 (=ARI3) are used independently of each other, and therefore when two ARIs are indicated to terminal 200, it is necessary to determine ARI that specifies PUCCH resources to be used. As an example, in FIG. 13B, when ARI indicated by a PDCCH (ARI1) is always given priority, base station 100 expects to receive a response signal by a PUCCH resource determined by ARI1. However, when terminal 200 fails to receive a PDCCH that specifies both PDSCHs of SCell 1 and SCell2, terminal 200 cannot receive ARI1. Instead, terminal 200 transmits a response signal using PUCCH resources determined by ARI indicated by the ePDCCH (ARI2) that specifies the PDSCHs of SCell3 and SCell4. Therefore, base station 100 is to assume reception of a response signal by PUCCH resources determined by ARI2 as well. That is, base station 100 is to secure two PUCCH resources (PUCCH Format 3 resources) intended for one terminal, which results in an increase of PUCCH overhead.

The method of indicating PUCCH resources according to the present embodiment is a method of determining PUCCH resources that prevents such PUCCH overhead from increasing. The method will be described with reference to FIGS. 14A to 14C.

In FIG. 14B, since the PDSCH of PCell is specified by the PDCCH, PUCCH resources (PUCCH Format 1b resources) associated in a one-to-one correspondence with the beginning CCE index $n_{CCE}$ of the CCE occupied by the PDCCH are specified. The PDSCHs of SCell1 and SCell2 are also specified by a PDCCH, and ARI (ARI1) is indicated to the TPC field by the PDCCH that specifies the PDSCHs. Furthermore, the PDSCHs of SCell3 and SCell4 are specified by an ePDCCH and ARI (ARI2) is indicated to the TPC field by the PDCCH that specifies the PDSCHs. In the present embodiment, ARI1 and ARI2 are always used as having the same value. Furthermore, the four previously set PUCCH resources are common so that PUCCH resources specified by ARI1 and ARI2 also become identical. Terminal 200 determines which one of the four previously set PUCCH resources (PUCCH Format 3 resources) is to be used for PUCCH transmission according to ARI (ARI1=ARI2) indicated by the PDCCH or ePDCCH.

In FIG. 14C, since the PDSCHs of PCell, SCell1 and SCell4 are specified by an ePDCCH, ARI is indicated to the TPC field (ARI3 is indicated to PCell, ARI2 is specified to SCell1 and SCell4) by the ePDCCH that specifies the PDSCHs. Furthermore, the PDSCHs of SCell2 and SCell3 are specified by a PDCCH and ARI (ARI1) is indicated to the TPC field by the PDCCH that specifies the PDSCHs. In the present embodiment, ARI1, ARI2 and ARI3 are always used as having the same value. Furthermore, the four previously set PUCCH resources are common so that PUCCH resources specified by ARI1, ARI2 and ARI3 also become identical. Terminal 200 determines which one of the four previously set PUCCH resources (PUCCH Format 3 resources) is to be used for PUCCH transmission according to ARI (ARI1=ARI2=ARI3) specified by the PDCCH or ePDCCH.

As described above, according to the present embodiment, when carrier aggregation is set in a case where a PDCCH and ePDCCH are used in combination, ARI2 and ARI3 are used as having the same value, and in addition, ARI1 is also used as having the same value as ARI2 and ARI3. Moreover, the four previously set PUCCH resources are made to be common so that PUCCH resources specified by ARI1, ARI2 and ARI3 also become identical. It is thereby possible to prevent PUCCH overhead from increasing when a PDCCH and ePDCCH are used in combination.

Note that when carrier aggregation is set, if a PDSCH is assigned to only PCell, PUCCH Format 1b resources may be used which are PUCCH resources optimized to the number of bits of a fewer results of error detection in the same way as when carrier aggregation is not set by specifying the PDSCHs not by ePDCCH but by PDCCH as in the case of Embodiment 2.

Embodiment 4

In the present embodiment, a description will be given of, in association with Embodiment 3, a method of indicating PUCCH resources when a PDCCH and ePDCCH are used in combination for each cell, and carrier aggregation and channel selection are set in terminal 200.

In the present embodiment, PDCCH and ePDCCH are used in combination for each cell or subframe as shown in FIG. 15A. For example, in subframe #0 (SF#0) in FIG. 15A, base station 100 uses the PDCCH to specify the PDSCH in PCell and uses the ePDCCH to specify the PDSCH in SCell. FIG. 15B shows the method of determining PUCCH resources in subframe #0 in FIG. 15A, FIG. 15C shows the method of determining PUCCH resources in subframe #1 in FIG. 15A, and FIG. 15D shows the method of determining PUCCH resources in subframe #2 in FIG. 15A.

In FIG. 15C, since the PDSCH of PCell is specified by an ePDCCH, ARI (ARI3) is specified to the TPC field by the ePDCCH that specifies the PDSCH. Furthermore, the PDSCH of SCell is specified by the PDCCH and ARI (ARI1) is specified to the TPC field by PDCCH that specifies the PDSCH. According to Embodiment 3, ARI1 and ARI3 are always used as having the same value. Furthermore, previously set PUCCH resources are common so that PUCCH resources specified by ARI1 and ARI3 also become identical. Terminal 200 determines which one of the four previously set PUCCH resource sets (PUCCH Format 1b resource set), each including four resources is to be used for PUCCH transmission according to ARI (ARI1=ARI3) specified by the PDCCH.

In FIG. 15D, since the PDSCH of PCell is specified by the ePDCCH, ARI (ARI3) is specified to the TPC field by the ePDCCH that specifies the PDSCH. Furthermore, the PDSCH of SCell is also specified by the ePDCCH and ARI (ARI2) is indicated to the TPC field by the ePDCCH that specifies the PDSCH. According to Embodiment 3, ARI2 and ARI3 are always used as having the same value. Moreover, previously set PUCCH resources are common so that PUCCH resources specified by ARI2 and ARI3 also become identical. Terminal 200 determine which one of the four previously set PUCCH resource sets (PUCCH Format 1b resource sets) each including four resources is to be used for PUCCH transmission according to ARI (ARI2=ARI3) specified by the PDCCH.

With respect to FIG. 15B, the result is similar to FIG. 15C and FIG. 15D. Since the PDSCH of PCell is specified by the PDCCH, PUCCH resources (PUCCH Format 1b resources) associated in a one-to-one correspondence with the beginning CCE index $n_{CCE}$ of the CCE occupied by the PDCCH and the next index are specified. Moreover, the PDSCH of SCell is specified by the ePDCCH and ARI (ARI2) is indicated to the TPC field by ePDCCH that specifies the PDSCH. Terminal 200 determines which one of the four previously set PUCCH resource sets (PUCCH Format 1b resource sets) each including four resources is to be used for PUCCH transmission according to ARI (ARI2) indicated by the ePDCCH.

Since, in FIG. 15D, ARI2 specifies which one of the four previously set PUCCH resource sets (PUCCH Format 1b resource sets) is to be used for PUCCH transmission, in FIG. 15B, ARI2 also specifies which one of the four previously set PUCCH resource sets (PUCCH Format 1b resource sets) is to be used for PUCCH transmission. On the other hand, in FIG. 15B, PUCCH resources corresponding to the beginning CCE index $n_{CCE}$ and the next $n_{CCE}+1$ of PDCCH that specifies the PDSCH of PCell are specified. Thus, in FIG. 15B, six PUCCH resources in total are specified, and it is necessary to determine which four resources are used. Particularly, as an example, PUCCH resources corresponding to $n_{CCE}$ and the next $n_{CCE}+1$ are given priority in FIG.

15B, base station 100 expects to receive a response signal using the PUCCH resources assuming PUCCH resources 0 and 1. However, upon failing to receive a PDCCH that specifies the PDSCH of PCell, terminal 200 transmits a response signal using PUCCH resources 0 and 1 (and 2 and 3) determined by ARI (ARI2) instructed by ePDCCH that specifies the PDSCH of SCell. Therefore, base station 100 is to assume reception of a response signal using PUCCH resources 0 and 1 determined by ARI2. That is, base station 100 is to secure six PUCCH resources (PUCCH Format 1b resources) for one terminal, which results in an increase of PUCCH overhead.

Thus, the method of indicating PUCCH resources according to the present embodiment is a method of determining PUCCH resources that prevents PUCCH overhead from increasing. The method will be described with reference to FIGS. 16A to 16D.

In FIG. 16C, since the PDSCH of PCell is specified by the ePDCCH, ARI (ARI3) is indicated to the TPC field by the ePDCCH that specifies the PDSCH. Terminal 200 determines which one of the four previously set PUCCH resource sets (PUCCH Format 1b resource sets) each including two resources is to be used for PUCCH transmission according to ARI (ARI3) indicated by the ePDCCH. Furthermore, the PDSCH of SCell is specified by the PDCCH and ARI (ARI1) is indicated to the TPC field by PDCCH that specifies the PDSCH. Terminal 200 determines which one of the four previously set PUCCH resource sets (PUCCH Format 1b resource sets) each including two resources is to be used for PUCCH transmission according to ARI (ARI1) indicated by the PDCCH. Terminal 200 determines PUCCH resources that indicate response signals from among the four PUCCH resources obtained above based on a combination of results of error detection.

In FIG. 16D, since the PDSCH of PCell is specified by the ePDCCH, ARI (ARI3) is indicated to the TPC field by the ePDCCH that specifies the PDSCH. Terminal 200 determines which one of the four previously set PUCCH resource sets (PUCCH Format 1b resource sets) each including two resources is to be used for PUCCH transmission according to ARI (ARI3) indicated by the ePDCCH. Furthermore, the PDSCH of SCell is also specified by the ePDCCH and ARI (ARI2) is indicated to the TPC field by the ePDCCH that specifies the PDSCH. Terminal 200 determines which one of the four previously set PUCCH resource sets (PUCCH Format 1b resource sets) each including two resources is to be used for PUCCH transmission according to ARI (ARI2) indicated by the ePDCCH. Terminal 200 determines PUCCH resources that indicate a response signal from among the four PUCCH resources obtained above based on a combination of results of error detection.

In FIG. 16B, since the PDSCH of PCell is specified by the PDCCH, PUCCH resources (PUCCH Format 1b resources) associated in a one-to-one correspondence with the beginning CCE index $n_{CCE}$ and the next CCE index of the CCE occupied by the PDCCH are specified. Furthermore, the PDSCH of SCell is specified by ePDCCH and ARI (ARI2) is indicated to the TPC field by the ePDCCH that specifies the PDSCH. Terminal 200 determines which one of the four previously set PUCCH resource sets (PUCCH Format 1b resource sets) each including two resources is to be used for PUCCH transmission according to ARI (ARI2) indicated by the ePDCCH. Terminal 200 determines a PUCCH resource for indicating a response signal from among the four PUCCH resources obtained above based on a combination of results of error detection.

As described above, according to the present embodiment, when channel selection is set, in a case where a PDCCH and ePDCCH are used in combination, ARI1 and ARI3, and PUCCH resources instructed by the respective ARIs are used independently. Furthermore, ARI2 and ARI3, and PUCCH resources instructed by the respective ARIs are used independently. It is thereby possible to prevent PUCCH overhead from increasing when a PDCCH and ePDCCH are operated in combination.

Note that since channel selection supports only two cells, ARI1 and ARI2 will not be simultaneously indicated. For this reason, previously set PUCCH resources may be set for ARI1 and ARI2 independently or may be set commonly. When PUCCH resources are set commonly, signaling of PUCCH resources can be made common for ARI1 and ARI2, and therefore signaling can be reduced.

Embodiments 1 to 4 have been described thus far.

The above description assumes that ARI is indicated to the TPC field, but the present invention is not limited to this, and a TPC command may be indicated to the TPC field and ARI may be further indicated to different fields within the same DL assignment (PDCCH or ePDCCH that specifies PDSCH). In short, ARI is to be indicated within DL assignment (PDSCH or ePDCCH that specifies PDCCH).

The functional blocks used in the embodiments described above may be implemented by software to be executed by a computer or may be implemented by software in concert with hardware.

The functional blocks described in the embodiments described above are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A terminal apparatus according to this disclosure is a terminal apparatus that communicates with a base station apparatus using a plurality of component carriers and that receives a downlink control signal in a first resource region usable for both a downlink control channel and a downlink data channel or a second resource region usable for a downlink control channel, the terminal apparatus including: a downlink control signal detection section that detects a downlink control signal assigned to the first resource region or the second resource region, for each of the component carriers; a receiving section that receives downlink data items using the plurality of component carriers, respectively; an error detection section that detects an error of each of the downlink data items; a generating section that generates a response signals using a result of error detection on each of the downlink data items, the result of error detection being obtained by the error detection section; and a control section that transmits the response signal to the base station apparatus, in which the control section switches between resource regions of an uplink communication control channel for transmitting the response signal, in accordance with whether the downlink control signal detection section detects the downlink control signal in the first resource region or the second resource region.

In the terminal apparatus according to this disclosure, the control section switches between the resource regions of the uplink control channel for transmitting the response signal when the downlink control signal detection section detects a downlink control signal in only the second resource region of a primary cell (PCell) and when the downlink control signal detection section detects a downlink control signal in any region at least other than the second resource region of the PCell.

A transmission method according to this disclosure is a transmission method for a terminal apparatus that communicates with a base station apparatus using a plurality of component carriers and that receives a downlink control signal in a first resource region usable for both a downlink control channel and a downlink data channel or a second resource region usable for a downlink control channel, the transmission method including: detecting a downlink control signal assigned to the first resource region or the second resource region, for each of the component carriers; receiving downlink data items using the plurality of component carriers, respectively; detecting an error of each of the downlink data items; generating a response signal using an obtained result of error detection on each of the downlink data items; and transmitting the response signal to the base station apparatus, in which switching between resource regions of an uplink communication control channel for transmitting the response signal is performed in accordance with whether the downlink control signal is detected in the first resource region or the second resource region.

The disclosure of Japanese Patent Application No. 2012-109502, filed on May 11, 2012, including the specification, drawings and abstract is incorporated herein by reference in its entirety.

INDUSTRIAL APPLICABILITY

The present invention is suitable for use in a mobile communication system or the like.

REFERENCE SIGNS LIST

100 Base station
200 Terminal
101, 208 Control section
102 Control information generating section
103, 105 Coding section
104, 107 Modulation section
106 Data transmission controlling section
108 Mapping section
109, 218 IFFT section
110, 219 CP adding section
111, 222 Radio transmitting section
112, 201 Radio receiving section
113, 202 CP removing section
114 PUCCH extracting section
115 Despreading section
116 Sequence control section
117 Correlation processing section
118 A/N determining section
119 Bundled A/N despreading section
120 IDFT section
121 Bundled A/N determining section
122 Retransmission control signal generating section
203 FFT section
204 Extraction section
205, 209 Demodulation section
206, 210 Decoding section
207 Determination section
211 CRC section
212 Response signal generating section
213 Coding and modulation section
214 Primary-spreading section
215 Secondary-spreading section
216 DFT section
217 Spreading section
220 Time-multiplexing section
221 Selection section

The invention claimed is:

1. A base station comprising:
a transmitter, which, in operation, transmits a first downlink control channel signal in an enhanced Physical Downlink Control Channel (ePDCCH) and transmits a second downlink control channel signal in a Physical Downlink Control Channel (PDCCH), wherein the first downlink control channel signal indicates assignment of a first downlink data in one or more component carriers and the second downlink control channel signal indicates assignment of a second downlink data in one or more component carriers; and
a receiver, which, in operation, receives a response signal in a physical uplink control channel (PUCCH) resource corresponding to a PUCCH resource value, wherein the PUCCH resource value corresponds to at least one of a first indicator value transmitted in the ePDCCH in a component carrier and a second indicator value transmitted in the PDCCH in another component carrier, and the first indicator value and the second indicator value are identical to denote a common PUCCH resource between the ePDCCH and the PDCCH.

2. The base station according to claim 1, wherein the first indicator value and the second indicator value are in Transmit Power Control (TPC) fields of the downlink control channel signals transmitted in the ePDCCH and the PDCCH.

3. The base station according to claim 1, wherein a total number of uplink component carriers is less than a total number of downlink component carriers.

4. The base station according to claim 1, wherein the PUCCH resource value is selected from a set of PUCCH resource values.

5. The base station according to claim 4, wherein the set of PUCCH resource values includes four PUCCH resource values.

6. A communication method performed by a base station, the communication method comprising:
transmitting a first downlink control channel signal in an enhanced Physical Downlink Control Channel (ePDCCH) and a second downlink control channel signal in a Physical Downlink Control Channel (PDCCH), wherein the first downlink control channel signal indicates assignment of a first downlink data in one or more component carriers and the second downlink control channel signal indicates assignment of a second downlink data in one or more component carriers; and
receiving a response signal in a physical uplink control channel (PUCCH) resource corresponding to a PUCCH resource value, wherein the PUCCH resource value corresponds to at least one of a first indicator value transmitted in the ePDCCH in a component carrier and a second indicator value transmitted in the PDCCH in another component carrier, and the first indicator value and the second indicator value are identical to denote a common PUCCH resource between the ePDCCH and the PDCCH.

7. The communication method according to claim 6, wherein the first indicator value and the second indicator value are in Transmit Power Control (TPC) fields of the downlink control channel signals transmitted in the ePDCCH and the PDCCH.

8. The communication method according to claim 6, wherein a total number of uplink component carriers is less than a total number of downlink component carriers.

9. The communication method according to claim 6, wherein the PUCCH resource value is selected from a set of PUCCH resource values.

10. The communication method according to claim 9, wherein the set of PUCCH resource values includes four PUCCH resource values.

11. An integrated circuit configured to control a process performed at a base station, comprising:
transmission circuitry which, in operation, controls transmission of a first downlink control channel signal in an enhanced Physical Downlink Control Channel (ePDCCH) and a second downlink control channel signal in a Physical Downlink Control Channel (PDCCH), wherein the first downlink control channel signal indicates assignment of a first downlink data in one or more component carriers and the second downlink control channel signal indicates assignment of a second downlink data in one or more component carriers; and
control circuitry which, in operation, controls reception of a response signal in a physical uplink control channel (PUCCH) resource corresponding to a PUCCH resource value, wherein the PUCCH resource value corresponds to at least one of a first indicator value transmitted in the ePDCCH in a component carrier and a second indicator value transmitted in the PDCCH in another component carrier, and the first indicator value and the second indicator value are identical to denote a common PUCCH resource between the ePDCCH and the PDCCH.

12. The integrated circuit according to claim 11, wherein the first indicator value and the second indicator value are in Transmit Power Control (TPC) fields of the downlink control channel signals transmitted in the ePDCCH and the PDCCH.

13. The integrated circuit according to claim 11, wherein a total number of uplink component carriers is less than a total number of downlink component carriers.

14. The integrated circuit according to claim 11, wherein the PUCCH resource value is selected from a set of PUCCH resource values.

15. The integrated circuit according to claim 14, wherein the set of PUCCH resource values includes four PUCCH resource values.

* * * * *